(12) United States Patent
Asao et al.

(10) Patent No.: US 6,501,205 B1
(45) Date of Patent: Dec. 31, 2002

(54) ALTERNATOR

(75) Inventors: Yoshihito Asao, Tokyo (JP); Katsumi Adachi, Tokyo (JP); Akira Morishita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 23 days.

(21) Appl. No.: 09/660,472

(22) Filed: Sep. 12, 2000

(30) Foreign Application Priority Data

Dec. 14, 1999 (JP) .............................................. 11-355194
May 30, 2000 (JP) ....................................... 2000-160370

(51) Int. Cl.⁷ .......................... H02K 3/00; H02K 17/00
(52) U.S. Cl. ...................... 310/184; 310/203; 310/208
(58) Field of Search .................................. 310/179, 180, 310/186, 195, 198, 199, 201, 202, 203, 204, 205, 206, 207, 208, 260; 29/605, 606; 320/63, 44, 45, 66

(56) References Cited

U.S. PATENT DOCUMENTS 1,796,424 A      3/1931   Apple
3,230,404 A   *  1/1966   Graham ...................... 310/208

(List continued on next page.)

FOREIGN PATENT DOCUMENTS

| DE | 199 22 794 A1 | 11/1999 |
| EP | 12566 A | 6/1980 |
| EP | 425132 A | 5/1991 |
| FR | 1465068 A | 1/1967 |
| GB | 782040 A | 8/1957 |
| JP | 49-86808 | 8/1974 |
| JP | 52-20204 | 2/1977 |
| JP | 58-116031 | 7/1983 |
| JP | 4-26345 | 1/1992 |
| JP | 11-155270 | 6/1999 |
| JP | 11-187599 | 7/1999 |
| JP | 11-285217 | 10/1999 |
| JP | 2000-125512 | 4/2000 |

OTHER PUBLICATIONS

*Patent Abstract of Japan*, vol. 1997, No. 08 (Aug. 29, 1997) as it relates to JP 09–103052 issued Apr. 15, 1997 to Mitsubishi Electric Corp.
*Patent Abstracts of Japan*, vol. 1999, No. 11 (Sep. 30, 1999) as it relates to JP 11–155270 issued Jun. 8, 1999 to Denso Corp.
*Patent Abstracts of Japan*, vol. 1999, No. 11 (Sep. 30, 1999) as it relates to JP 11–164506 issued Jun. 18, 1999 to Denso Corp.
*Patent Abstracts of Japan*, vol. 1999, No. 8 (Jun. 30, 1999) as it relates to JP 11–075334 issued Mar. 16, 1999 to Denso Corp.
*Patent Abstracts of Japan*, vol. 007, No. 226 (E–202) (Oct. 7, 1983) as it relates to JP 58–116031 issued Jul. 11, 1983 to Tokyo Shibaura Denki KK.
Japanese Office Action dated Feb. 27, 2001 (No Translation).

*Primary Examiner*—Dang Dinh Le
(74) *Attorney, Agent, or Firm*—Sughrue Mion, PLLC

(57) ABSTRACT

An alternator includes a rotor for forming north-seeking (N) and south-seeking (S) poles about a rotational circumference, a stator having a stator core disposed facing the rotor and a polyphase stator winding installed in the stator core, and a bracket supporting the rotor and the stator, wherein the stator core includes a laminated iron core formed with a number of slots extending axially at a predetermined pitch in a circumferential direction, the polyphase stator winding includes a number of winding sub-portions in each which a long strand of wire is wound so as to alternately occupy an inner layer and an outer layer in a slot depth direction within the slots at intervals of a predetermined number of slots, the strand of wire folding back outside the slots at axial end surfaces of the stator core to form turn portions, and the turn portions align in a circumferential direction to constitute coil end groups.

27 Claims, 26 Drawing Sheets

U.S. PATENT DOCUMENTS

| | | | | |
|---|---|---|---|---|
| 3,453,468 A | * | 7/1969 | Lund | 310/208 |
| 3,688,137 A | * | 8/1972 | Filhol | 310/43 |
| 4,847,526 A | * | 7/1989 | Takehara et al. | 310/185 |
| 4,954,734 A | * | 9/1990 | Iguchi et al. | 310/71 |
| 5,107,159 A | * | 4/1992 | Kordik | 310/156 |
| 5,955,810 A | | 9/1999 | Umeda et al. | |
| 5,998,903 A | * | 12/1999 | Umeda et al. | 310/179 |
| 6,140,735 A | * | 10/2000 | Kato et al. | 310/201 |
| 6,147,432 A | * | 11/2000 | Kusase et al. | 310/260 |
| 6,288,471 B1 | * | 9/2001 | Kometani et al. | 310/254 |

* cited by examiner

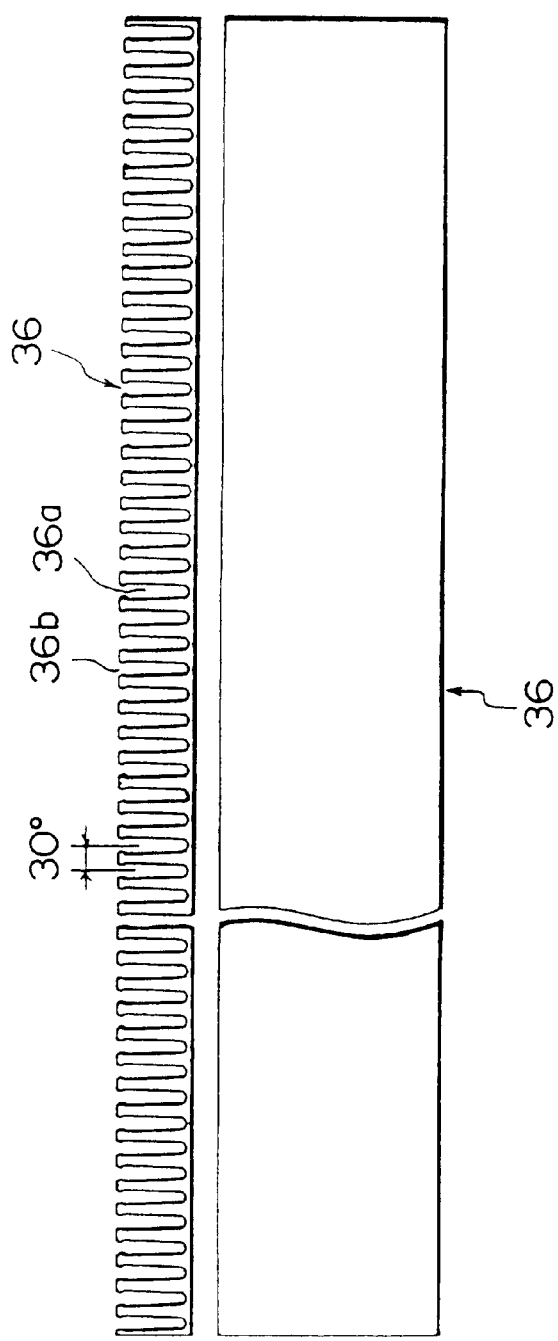

ALTERNATOR

BACKGROUND OF THE INVENTION

1. Field of the Invention

The present invention relates to an alternator driven by an internal combustion engine, for example, and in particular, relates to a stator construction for an automotive alternator mounted to an automotive vehicle such as a passenger car or a truck.

2. Description of the Related Art

In recent years, compact high output and improvements in quality have been increasingly required of alternators. In order to achieve compact high output, it is important to design constructions which distribute magnetic loading and electrical loading in the most appropriate manner, and with the highest possible density within a limited volume.

For example, as engine compartments become progressively smaller, mounting space for automotive alternators is becoming less and less free, but at the same time, improvements in alternator output are required because of increases in automotive vehicle loads. Furthermore, there is increased need for noise reduction both inside and outside automotive vehicles, and although engine noise has been reduced, noise from automotive alternators, which run constantly to generate electricity in order to supply the electrical load for the vehicle, has remained a problem. Fan noise and magnetic noise in particular have been problems in automotive alternators which operate in a wide range of rotational frequencies from low to high speed.

Because automotive alternators are constantly generating electricity, they generate a lot of heat due to the joule heat of the output electric current and are subjected to a severe heat environment, requiring extremely high heat resistance.

Furthermore, within the engine compartment, an automotive alternator is often mounted directly onto an engine, where it is exposed to liquids such as engine oil and antifreeze, in addition to rain water, salt water, mud, etc., conditions where the corrosive environment is extremely severe. There are problems due to corrosion which lead to interruptions in power generation, etc., but most causes of interruption to power generation are the result of damage to insulation on a winding which occurs during the process of manufacturing a stator, or due to electrical short-circuiting in structurally exposed portions of the winding.

For compact high output by alternators, in particular, it is necessary to increase the space factor of electrical conductors housed within magnetic circuits of the stator, and to line up and increase the density of bridge portions of the stator winding (bridge portions outside a stator core are called coil ends), and in addition to this, various improvements have been proposed in order to answer the requirements for low noise, heat-resistance, corrosion resistance, etc., mentioned above. Constructions aimed at increasing the space factor of the electrical conductors using short conductor segments for the electrical conductors in the stator or aimed at lining up and increasing the density of the coil ends have been proposed in the publication of WO 92/06527 and in Japanese Patent No. 2927288, for example.

FIG. 29 is a side elevation showing part of a stator of a conventional automotive alternator such as described in Japanese Patent No. 2927288, for example, FIG. 30 is a perspective showing a conductor segment used in the stator of the conventional automotive alternator shown in FIG. 29, and FIGS. 31 and 32 are perspectives from a front end and a rear end, respectively, of part of the stator of the conventional automotive alternator shown in FIG. 29.

In FIGS. 29 to 32, the stator 50 includes: a stator core 51; a stator winding 52 wound onto the stator core 51; and insulators 53 mounted inside slots 51a, the insulators 53 insulating the stator winding 52 from the stator core 51. The stator core 51 is a cylindrical laminated core laminated by stacking thin steel plates; and has a number of slots 51a extending axially disposed at even pitch circumferentially so as to be open on an inner circumferential side. In this case, ninety-six slots 51a are formed so as to house two sets of three-phase winding portions such that the number of slots housing each phase of the winding portions corresponds to the number of magnetic poles (sixteen) in a rotor (not shown). The stator winding 52 is constructed by joining a number of short conductor segments 54 in a predetermined winding pattern.

The conductor segments 54 are formed into a general U shape from an insulated copper wire material having a rectangular cross section, and are inserted two at a time from an axial rear end into pairs of slots 51a six slots apart (a pitch of one magnetic pole). Then, end portions of the conductor segments 54 extending outwards at a front end are joined to each other to constitute the stator winding 52.

More specifically, in pairs of slots 51a six slots apart, first conductor segments 54 are inserted from the rear end into first positions from an outer circumferential side within first slots 51a and into second positions from the outer circumferential side within second slots 51a, and second conductor segments 54 are inserted from the rear end into third positions from the outer circumferential side within the first slots 51a and into fourth positions from the outer circumferential side within the second slots 51a. Thus, within each slot 51a, four straight portions 54a of the conductor segments 54 are arranged to line up in a row in a radial direction.

Then, end portions 54b of the conductor segments 54 extending outwards at the front end. from the first positions from the outer circumferential side within the first slots 51a and end portions 54b of the conductor segments 54 extending outwards at the front end from the second positions from the outer circumferential side within the second slots 51a six slots away in a clockwise direction from the first slots 51a are joined to form an outer layer winding having two turns. In addition, end portions 54b of the conductor segments 54 extending outwards at the front end from the third positions from the outer circumferential side within the first slots 51a and end portions 54b of the conductor segments 54 extending outwards at the front end from the fourth positions from the outer circumferential side within the second slots 51a six slots away in a clockwise direction from the first slots 51a are joined to form an inner layer winding having two turns.

In addition, the inner layer winding and outer layer winding constituted by the conductor segments 54 inserted into the pairs of slots 51a six slots apart are connected in series to form one phase of the stator winding 52 having four turns.

A total of six phases of the stator winding 52 each having four turns are formed in this manner. Then, two sets of three-phase stator winding portions are constructed by connecting three phases each of the stator winding 52 into alternating current connections.

In the conventional stator 50 constructed in this manner, at the rear end of the stator core 51, turn portions 54c of the pairs of conductor segments 54 inserted into the same pairs of slots 51a are lined up in rows in a radial direction. As a result, the turn portions 54c are arranged in two rows circumferentially to constitute a rear-end coil end group.

At the front end of the stator core 51, on the other hand, joint portions formed by joining the end portions 54b of the conductor segments 54 extending outwards at the front end from the first positions from the outer circumferential side within the first slots 51a and the end portions 54b of the conductor segments 54 extending outwards at the front end from the second positions from the outer circumferential side within the second slots 51a six slots away, and joint portions formed by joining the end portions 54b of the conductor segments 54 extending outwards at the front end from the third positions from the outer circumferential side within the first slots 51a and the end portions 54b of the conductor segments 54 extending outwards at the front end from the fourth positions from the outer circumferential side within the second slots 51a six slots away are arranged to line up radially. As a result, joint portions formed by joining end portions 54b to each other are arranged in two rows circumferentially to constitute a front-end coil end group.

In the stator 50 of the conventional automotive alternator, as explained above, the stator winding 52 is constructed by inserting short conductor segments 54 formed in the general U shape into the slots 51a of the stator core 51 from the rear end, and joining end portions 54b of the conductor segments 54 extending outwards at the front end.

Thus, because the front-end coil end group is constructed by circumferentially arranging the joint portions formed by joining the end portions 54b, which have lost their insulation due to soldering or welding, the coil-end construction is easily corroded by exposure to moisture, making corrosion resistance extremely low.

Furthermore, because the front-end coil end group is composed of two rows of ninety-six joint portions, i.e., 192 joint portions, the construction facilitates short-circuiting between the joint portions, increasing the likelihood of short-circuiting accidents.

A large number of the short conductor segments 54 must be inserted into the stator core 51 and their end portions 54b must be joined by welding, soldering, etc., significantly reducing operability. Furthermore, the amount of each conductor segment 54 which is inserted into the slots 51a must be greater than the length of the stator core 51, facilitating damage to the insulation and reducing the quality of the finished product. In addition, when joining the end portions 54b, short-circuiting often occurs between the joint portions due to spilt solder or weld melt, significantly decreasing mass-producibility.

The end portions 54b of the. conductor segments 54 are joined to each other by clamping a portion thereof in a jig, and soldering or welding the tips thereof. Thus, because clamping area is required for the jig and expansion of the soldered portions or welded portions occurs, the height of the coil ends is increased and space between the joint portions is reduced. As a result, coil leakage reactance in the coil end portions is increased, causing output to deteriorate, and wind resistance is increased, exacerbating wind noise.

Furthermore, as a measure against magnetic noise, mutual cancellation of magnetic pulsation forces by winding two sets of three-phase windings into slots in positions offset by an electrical phase difference of 30° has been proposed in Japanese Patent Laid-Open No. HEI 4-26345, for example. However, when attempts are made to adopt this example of improvement of magnetic noise in small stators, the slot spacing becomes extremely narrow because twice as many slots are required. Thus, it was not possible to apply general winding methods in which a stator winding is constructed by preparing an annular coil by winding continuous wire into an annular shape, then, preparing a star coil by deforming this annular coil into a star shape, then installing straight portions of the star coil into the slots of the stator core. Furthermore, the above-mentioned winding method using the conductor segments 54 could not be applied because buckling, etc., of the conductor segments 54 occurs during insertion into the slots. Additionally, when welding the end portions 54b of the conductor segments 54 to each other, the conductor segments 54 are softened by temperature increases during welding, reducing the rigidity of the stator and decreasing the effective reduction in magnetic noise.

In addition, it is necessary to answer the various demands of automotive alternator output with electromagnetic design. In particular, in order to improve output of an alternator in a low-speed frequency region in response to idling frequency in an automotive engine, it is necessary to shift an output commencement frequency to the low-speed side. To this end, it is necessary to improve the voltage induced by the alternator by increasing magnetomotive force, that is, electric current supplied to a field coil, or by increasing the total conductor count, that is, the number of turns in the stator. Now, with the former, the output commencement frequency can be shifted to the low-speed side by increasing the supply of electric current to the field coil, but this is limited by reductions in the saturation of the magnetic circuits. With the latter, the output commencement frequency can be shifted to the low-speed side by increasing the number of turns, but when attempts are made to increase the total conductor count in a winding based on conductor segments 54, the number of joint portions increases proportionately, leaving no space for joining, and excessive increases in the number of turns cannot be practically applied.

SUMMARY OF THE INVENTION

The present invention aims to solve the above problems with the conventional art and an object of the present invention is to provide an alternator having both high serviceability and productivity, capable of satisfying the performance and quality commonly required of today's alternators.

An additional object of the present invention is to provide an alternator applicable to automotive use which has compactness, high output, and low noise.

In order to achieve the above object, according to one aspect of the present invention, there is provided an alternator comprising:
  a rotor for forming north-seeking (N) and south-seeking (S) poles along a rotational circumference;
  a stator comprising:
    a stator core disposed facing the rotor; and
    a polyphase stator winding installed in the stator core; and
  a bracket supporting the rotor and the stator,
  wherein the stator core comprises a laminated iron core formed with a number of slots extending axially at a predetermined pitch in a circumferential direction,
  the polyphase stator winding comprises a number of winding sub-portions in each which a long strand of wire is wound so as to alternately occupy an inner layer and an outer layer in a slot depth direction within the slots at intervals of a predetermined number of slots, the strand of wire folding back outside the slots at axial end surfaces of the stator core to form turn portions, and the turn portions align in a circumferential direction to constitute coil end groups.

BRIEF DESCRIPTION OF THE DRAWINGS

FIGS. 11A and 11B are a side elevation and a rear elevation, respectively, explaining the construction of a stator core used in this automotive alternator;

DETAILED DESCRIPTION OF THE PREFERRED EMBODIMENTS

The preferred embodiments of the present invention will now be explained with reference to the drawings.

Embodiment 1

Figure 1:
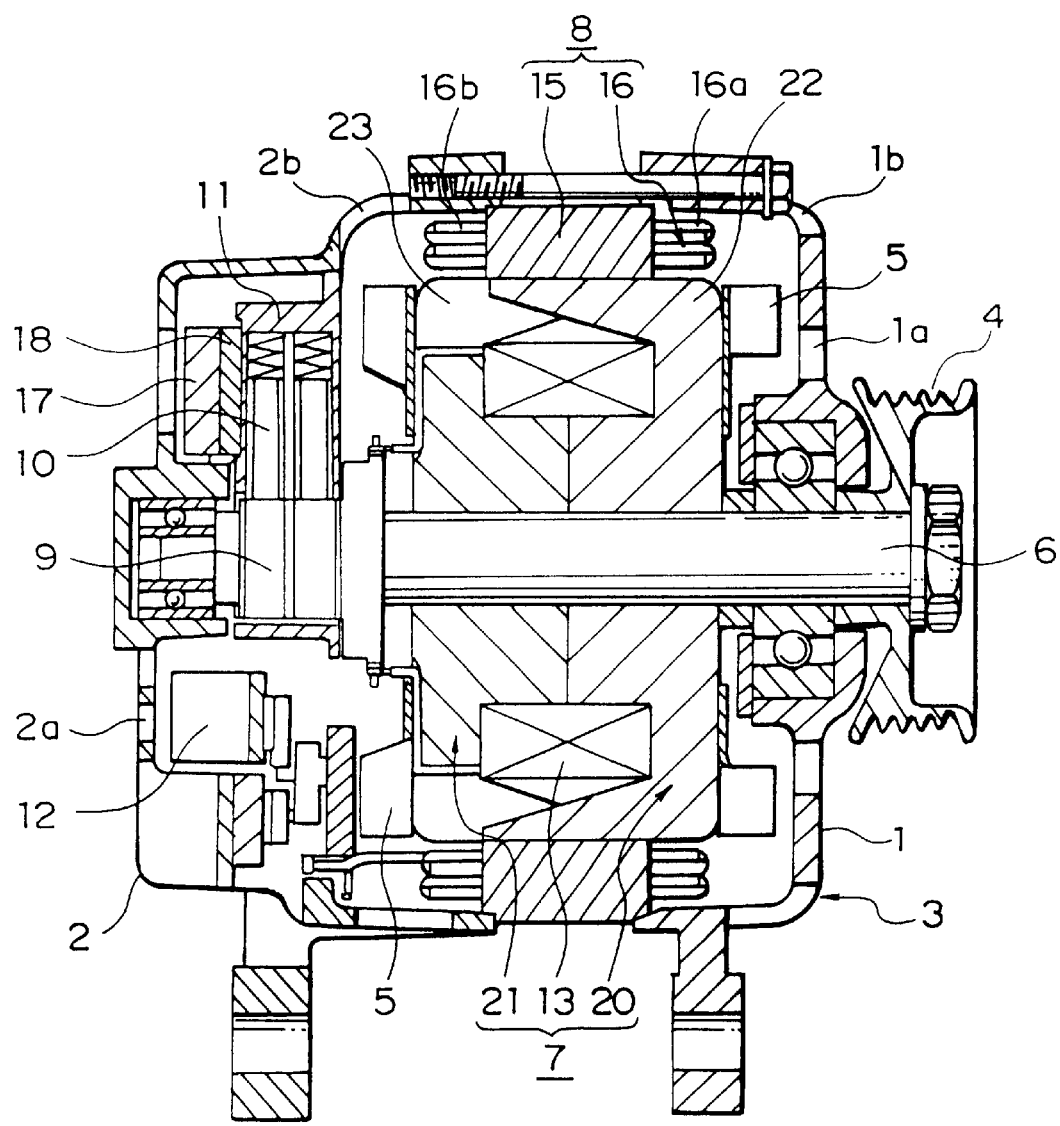
FIG. 1 is a cross section showing a construction of an automotive alternator according to Embodiment 1 of the present invention.
Figure 2:
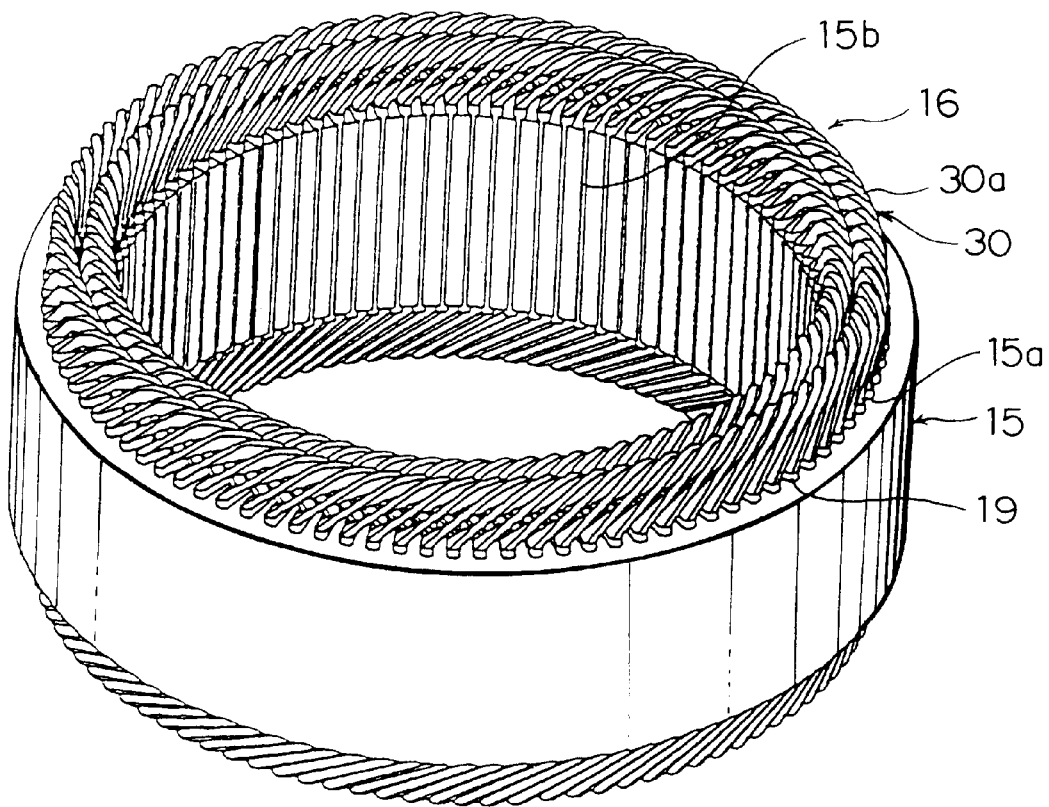
FIG. 2 is a perspective showing a stator of the automotive alternator according to Embodiment 1 of the present invention.
Figure 3:
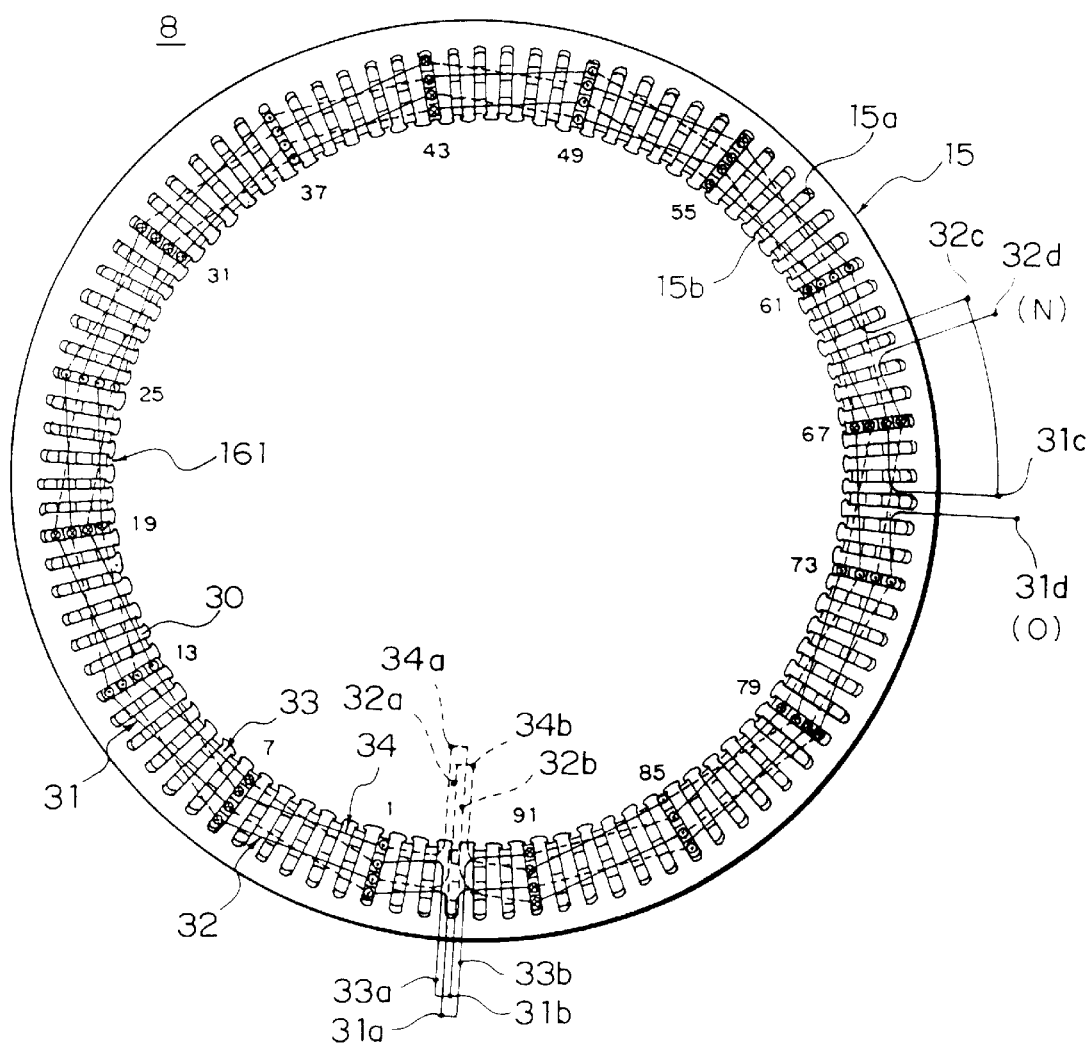
FIG. 3 is an end elevation explaining connections in one phase of stator winding group in the automotive alternator according to Embodiment 1 of the present invention.
Figure 4:
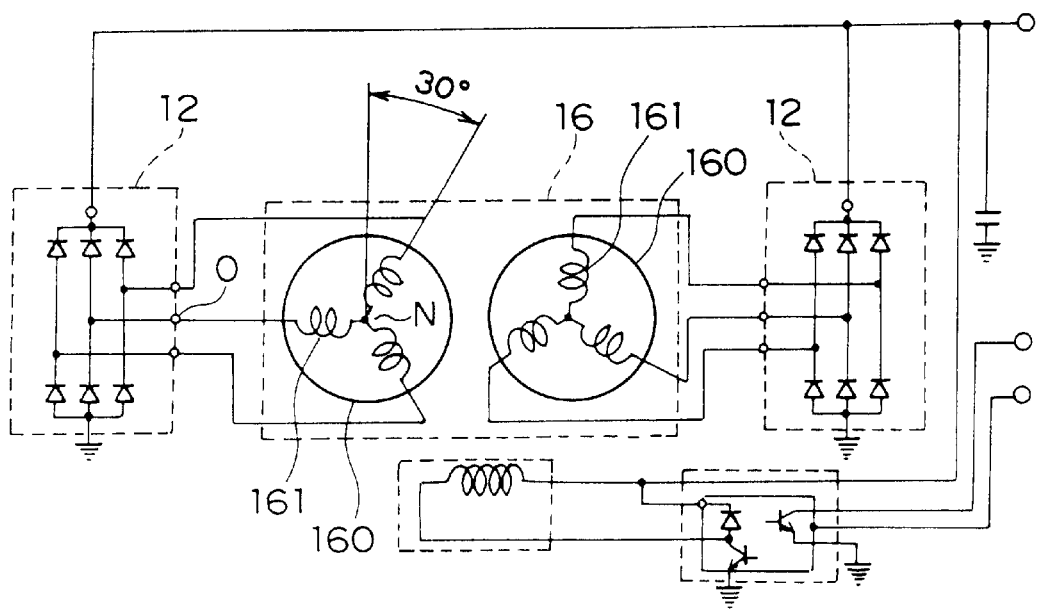
FIG. 4 is a circuit diagram for the automotive alternator according to Embodiment 1 of the present invention.
Figure 5:
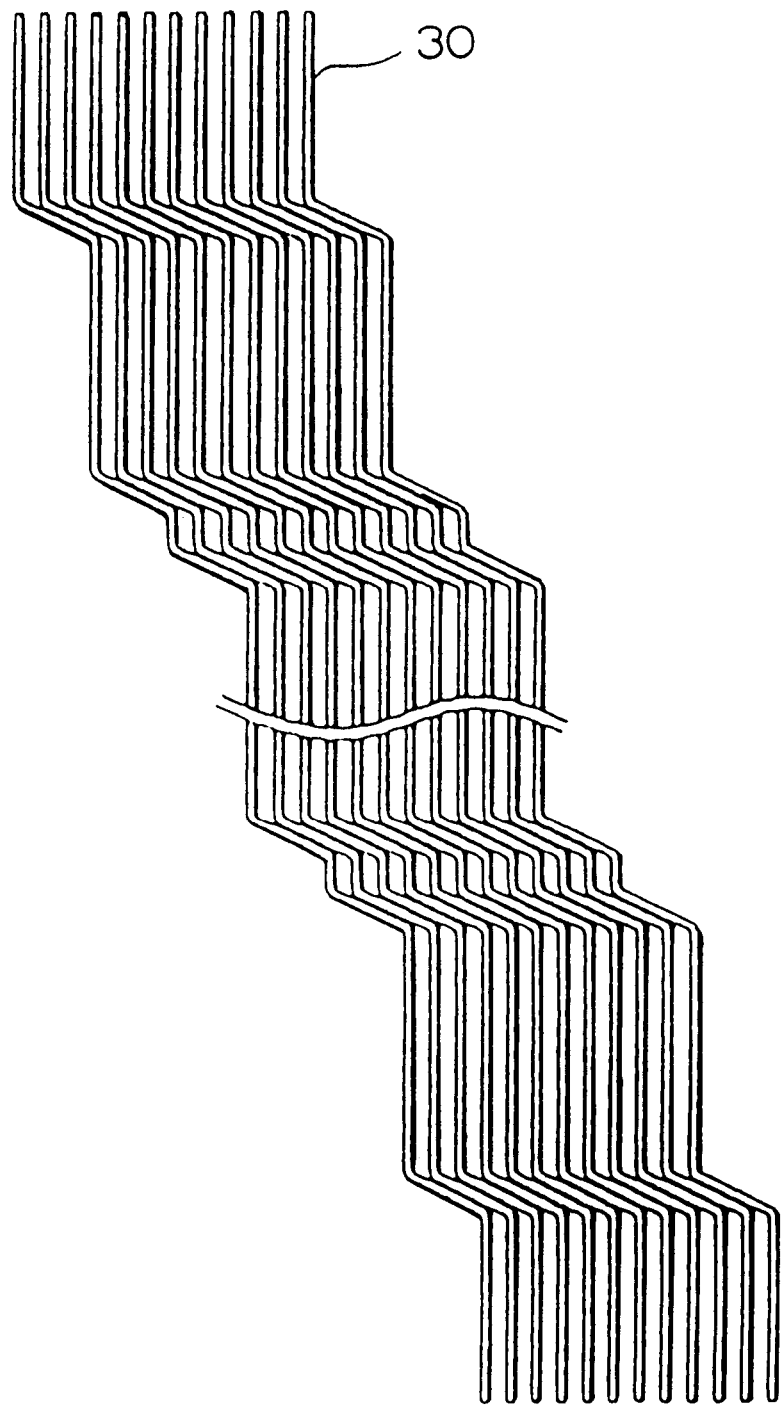
FIG. 5 is a diagram explaining the manufacturing process for winding groups constituting part of the stator winding used in the automotive alternator according to Embodiment 1 of the present invention.
Figure 6:
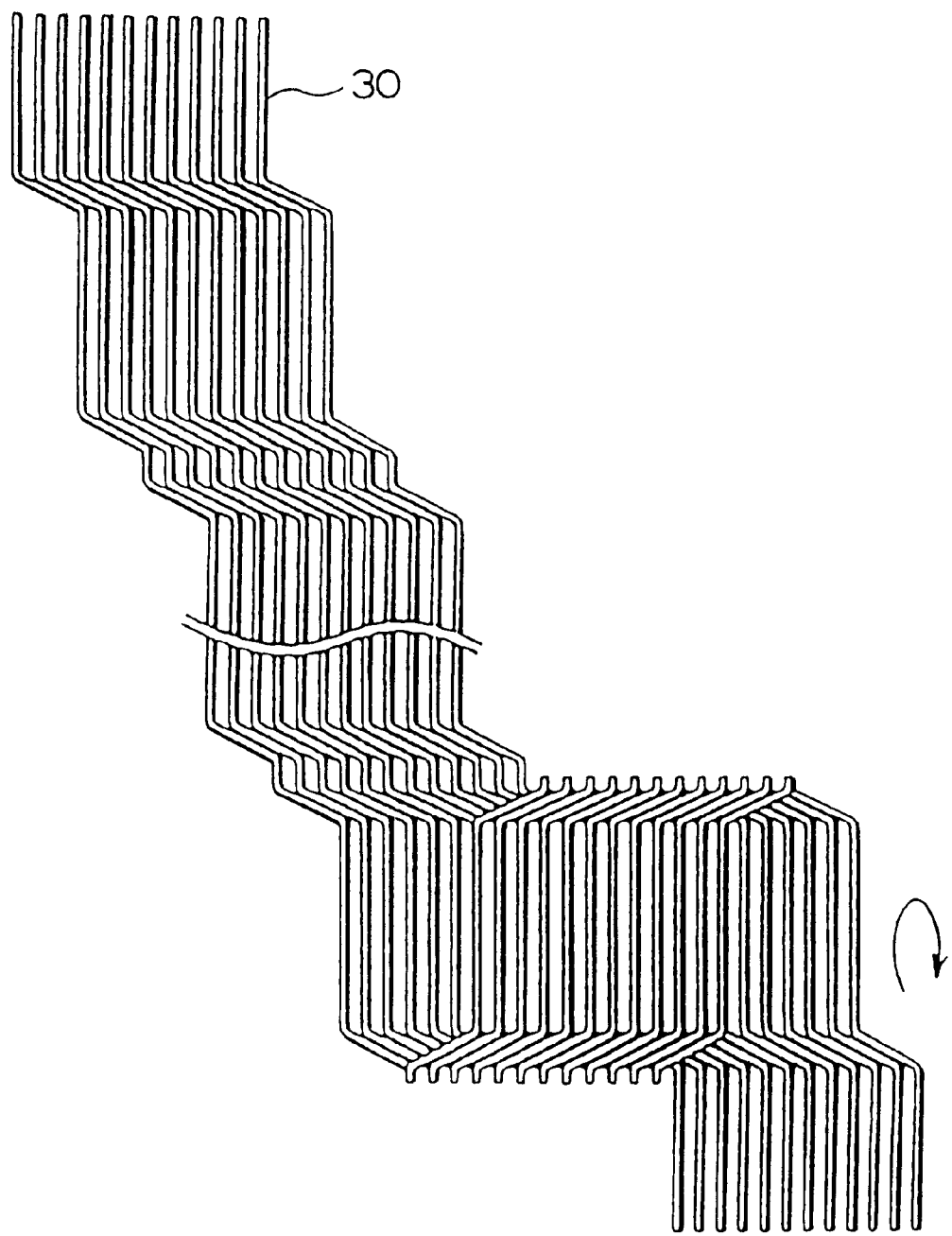
FIG. 6 is a diagram explaining the manufacturing process for winding groups constituting part of the stator winding used in the automotive alternator according to Embodiment 1 of the present invention.
Figures 7A, 7B:
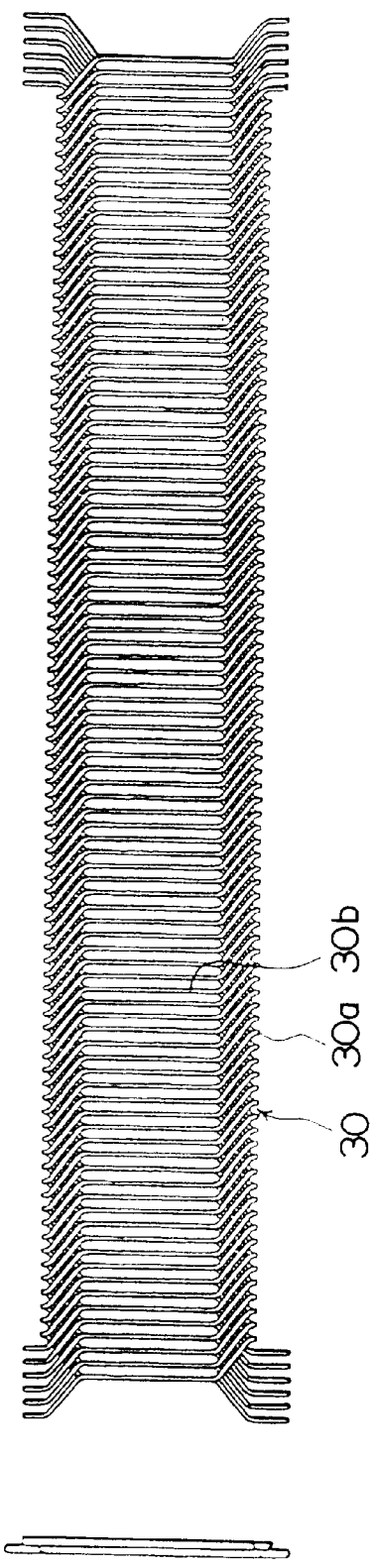
FIGS. 7A and 7B are an end elevation and a plan view, respectively, showing an inner-layer wire-strand group constituting part of the stator winding used in the automotive alternator according to Embodiment 1 of the present invention.
Figures 8A, 8B:
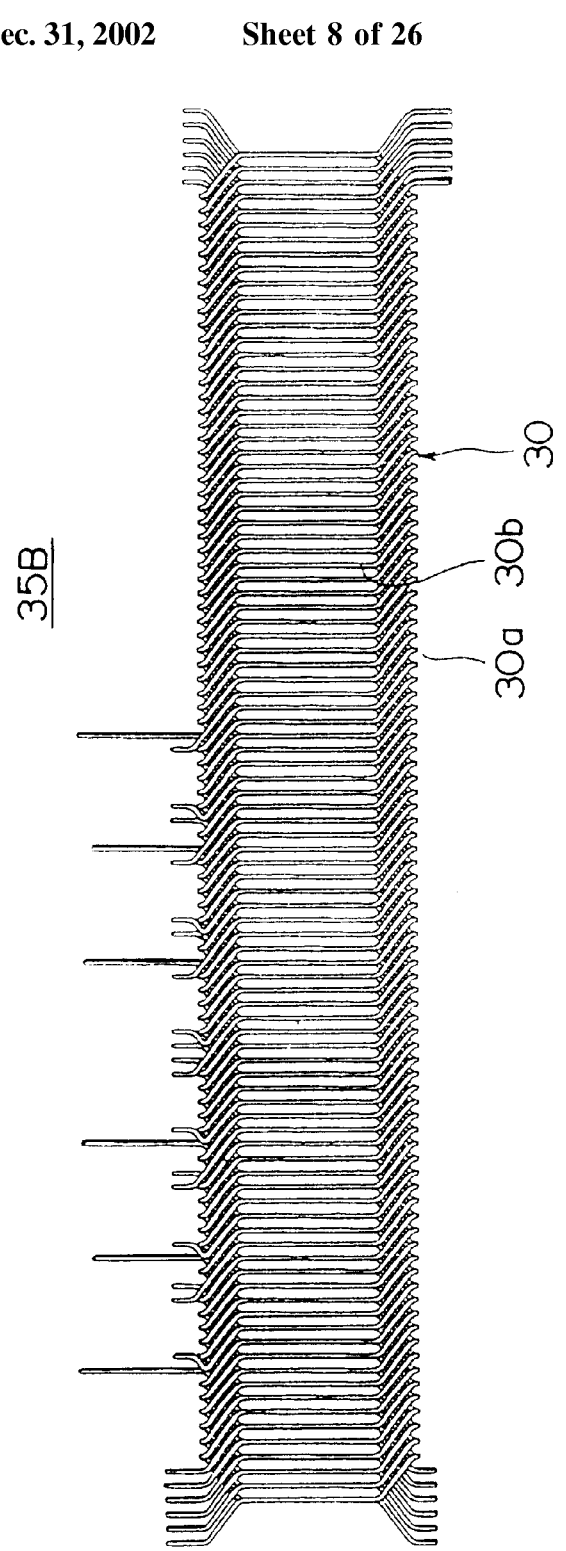
FIGS. 8A and 8B are an end elevation and a plan view, respectively, showing an outer-layer wire-strand group constituting part of the stator winding used in the automotive alternator according to Embodiment 1 of the present invention.
Figure 9:
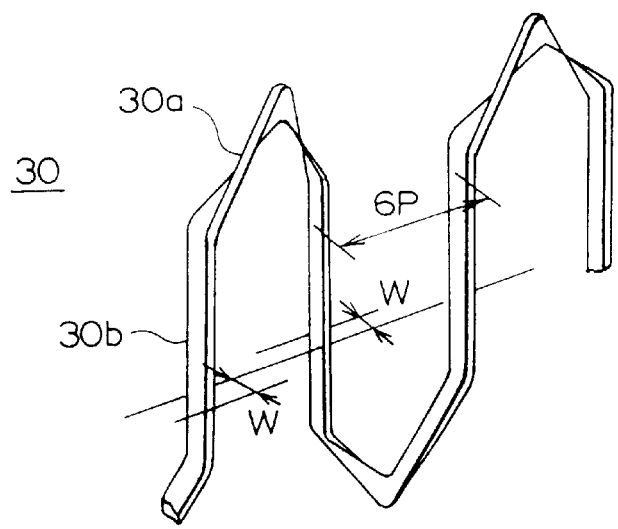
FIG. 9 is a perspective showing part of a strand of wire constituting part of the stator winding used in the automotive alternator according to Embodiment 1 of the present invention.
Figure 10:
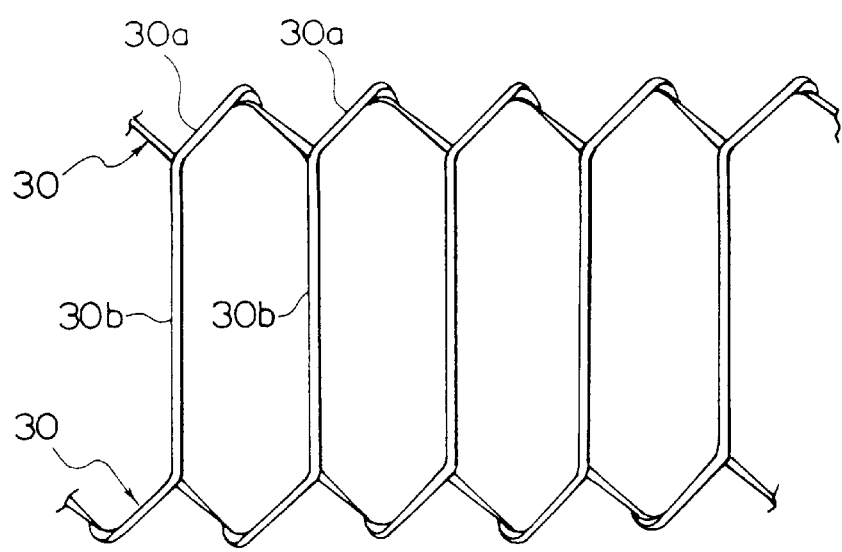
FIG. 10 is a diagram explaining arrangement of the strands of wire constituting part of the stator winding used in the automotive alternator according to Embodiment 1 of the present invention.
Figure 12A:
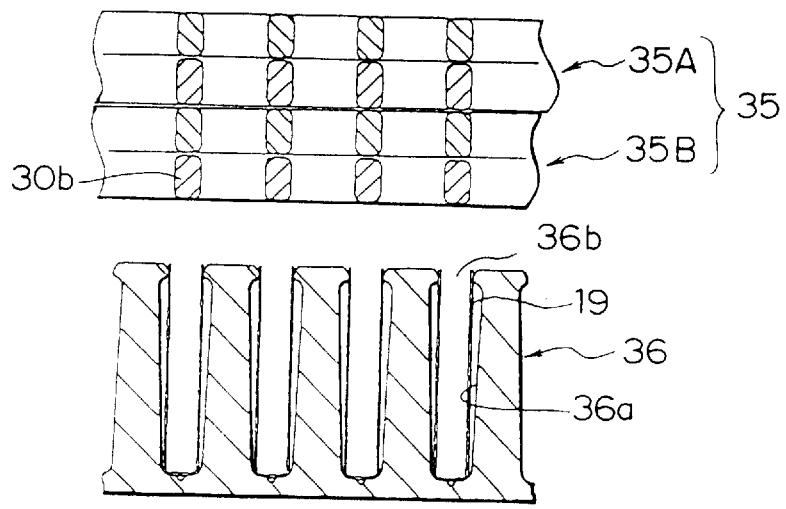
FIGS. 12A to 12C are cross sections explaining the manufacturing process for the stator used in this automotive alternator.
Figure 12B:
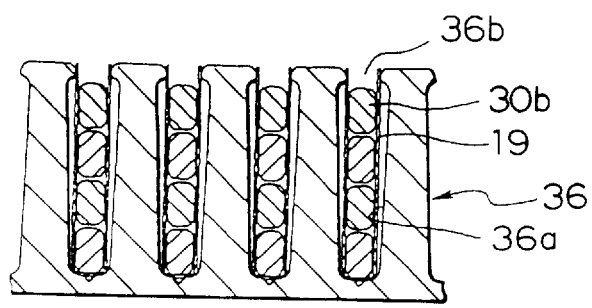
Figure 12C:
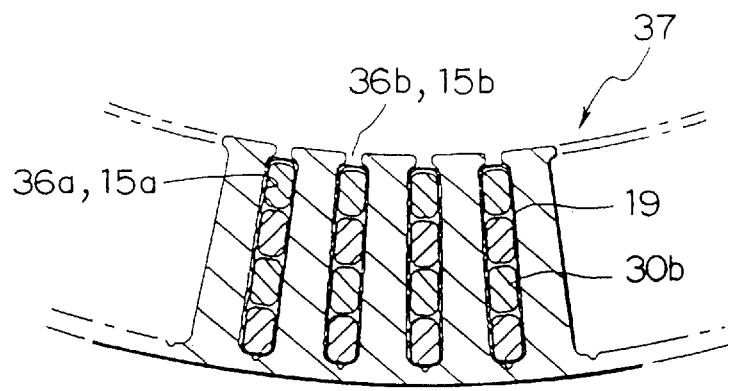
Figure 13:
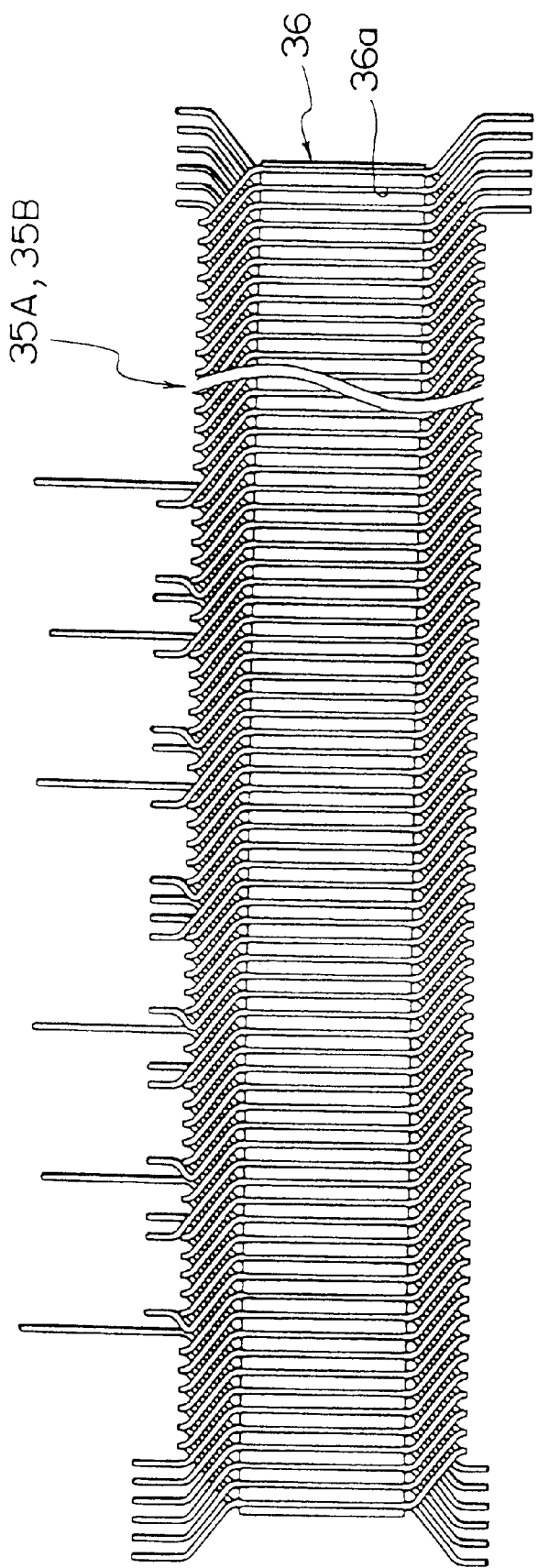
FIG. 13 is a plan view showing a wire-strand group constituting part of the stator winding used in this automotive alternator mounted into the core.
Figure 14:
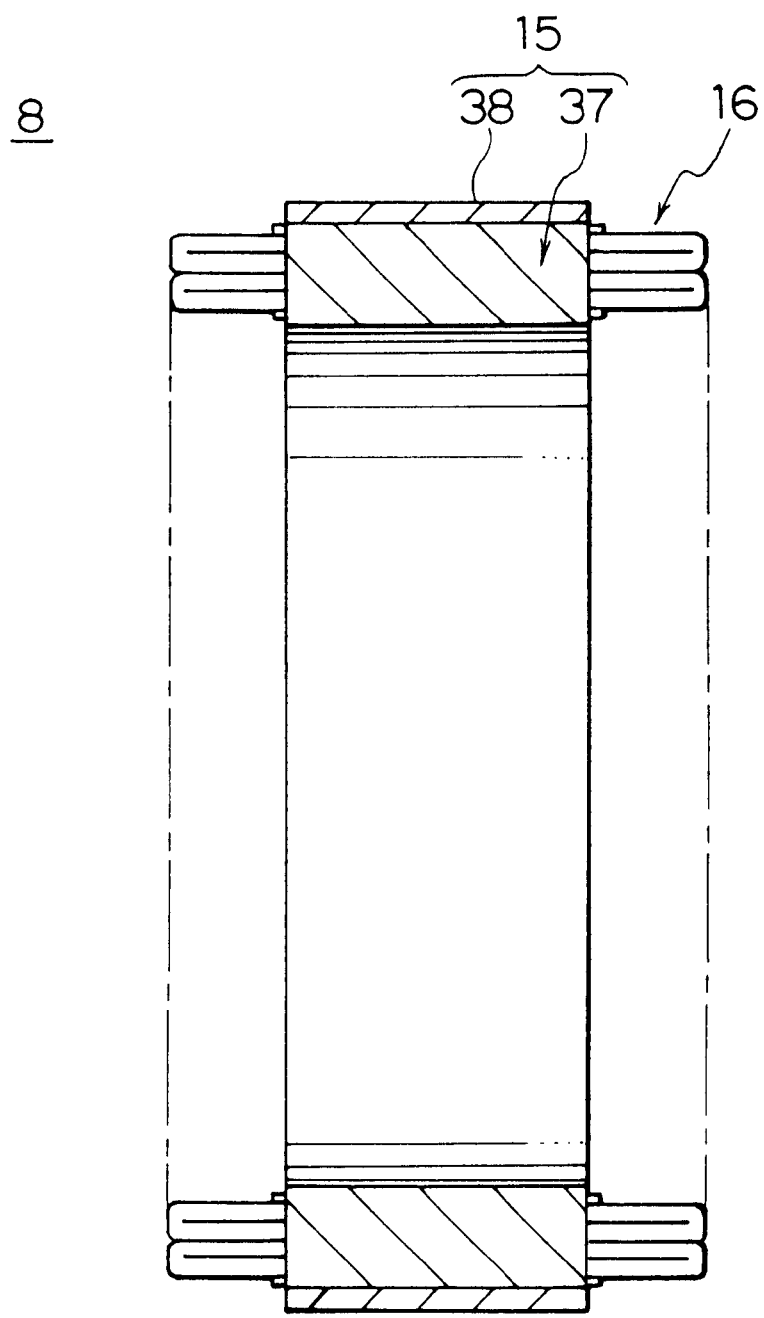
FIG. 14 is a cross section explaining the manufacturing process for the stator used in the automotive alternator according to Embodiment 1 of the present invention.

FIG. 1 is a cross section showing a construction of an automotive alternator according to Embodiment 1 of the present invention, FIG. 2 is a perspective showing a stator of this automotive alternator, FIG. 3 is an end elevation explaining connections in one phase of stator winding group in this automotive alternator, FIG. 4 is a circuit diagram for this automotive alternator, FIGS. 5 and 6 are diagrams explaining the manufacturing process for winding groups constituting part of the stator winding used in this automotive alternator, FIGS. 7A and 7B are an end elevation and a plan view, respectively, showing an inner-layer wire-strand group constituting part of the stator winding used in this automotive alternator, FIGS. 8A and 8B are an end elevation and a plan view, respectively, showing an outer-layer wire-strand group constituting part of the stator winding used in this automotive alternator, FIG. 9 is a perspective showing part of a strand of wire constituting part of the stator winding used in this automotive alternator, FIG. 10 is a diagram explaining arrangement of the strands of wire constituting part of the stator winding used in this automotive alternator, FIGS. 11A and 11B are a side elevation and a rear elevation, respectively, explaining the construction of a stator core used in this automotive alternator, FIGS. 12A to 12C are cross sections explaining the manufacturing process for the stator used in this automotive alternator, FIG. 13 is a plan view showing a wire-strand group constituting part of the stator winding used in this automotive alternator mounted into the core, and FIG. 14 is a cross section explaining the manufacturing process for the stator used in this automotive alternator. Moreover, output wires and bridging connections have been omitted from FIG. 2.

In FIG. 1, the automotive alternator is constructed by rotatably mounting a Lundell-type rotor 7 inside a case constructed from an aluminum front bracket 1 and an aluminum rear bracket 2 by means of a shaft 6, and fastening a stator 8 to an inner wall of the case so as to cover an outer circumferential side of the rotor 7.

The shaft 6 is rotatably supported in the front bracket 1 and the rear bracket 2. A pulley 4 is fastened to a first end of this shaft 6 so that rotational torque from an engine can be transmitted to the shaft 6 by means of a belt (not shown).

Slip rings 9 for supplying electric current to the rotor 7 are fastened to a second end of the shaft 6, and a pair of brushes 10 are housed in a brush holder 11 disposed inside the case such that the pair of brushes 10 slide in contact with the slip rings 9. A regulator 18 for adjusting the magnitude of alternating voltage generated in the stator 8 is fastened by adhesive to a heat sink 17 fitted onto the brush holder 11. Rectifiers 12 which are electrically connected to the. stator 8 and convert alternating current generated in the stator 8 into direct current are mounted inside the case 3.

The rotor 7 is composed of a rotor coil 13 for generating magnetic flux on passage of electric current, and a pair of pole cores 20 and 21 disposed so as to cover the rotor coil 13, magnetic poles being formed in the pole cores 20 and 21 by magnetic flux generated in the rotor coil 13. The pair of pole cores 20 and 21 are made of iron, each has eight claw-shaped magnetic poles 22 and 23 disposed on an outer circumferential edge thereof at even pitch in a circumferential direction so as to project axially, and the pole cores 20 and 21 are fastened to the shaft 6 facing each other such that the claw-shaped magnetic poles 22 and 23 intermesh. In addition, fans 5 are fastened to first and second axial ends of the rotor 7.

Intake openings 1a and 2a are disposed in axial end surfaces of the front bracket 1 and the rear bracket 2, and discharge openings 1b and 2b are disposed in two outer circumferential shoulder portions of the front bracket 1 and the rear bracket 2, opposite the radial outside of the front-end and rear-end coil ends 16a and 16b of the stator winding 16.

As shown in FIG. 2, the stator 8 includes: a cylindrical stator core 15 composed of a laminated core formed with a number of slots 15a extending axially at a predetermined pitch in a circumferential direction; a polyphase stator winding 16 wound onto the stator core 15; and insulators 19 installed in each of the slots 15a for electrically insulating the polyphase stator winding 16 from the stator core 15. The polyphase stator winding 16 includes a number of windings in each of which one strand of wire 30 is bent back outside the slots 15a at end surfaces of the stator core 15 and wound into a wave winding so as to alternately occupy an inner layer and an outer layer in a slot depth direction within slots 15a a predetermined number of slots apart. In this case, the stator core 15 is formed with ninety-six slots 15a at even pitch so as to house two sets of three-phase stator winding portions 160 such that the number of slots housing each phase of the winding portions corresponds to the number of magnetic poles (sixteen) in the rotor 7. Long, insulated copper wire material having a rectangular cross section, for example, is used in the strands of wire 30.

Next, the winding construction of one phase of stator winding group 161 will be explained in detail with reference to FIG. 3.

One phase of stator winding group 161 is composed of first to fourth winding sub-portions 31 to 34 each formed from one strand of wire 30. The first winding sub-portion 31 is formed by wave winding one strand of wire 30 into every sixth slot from slot numbers 1 to 91 so as to alternately occupy a first position from an outer circumferential side and a second position from the outer circumferential side inside the slots 15a. The second winding sub-portion 32 is formed by wave winding a strand of wire 30 into every sixth slot from slot numbers 1 to 91 so as to alternately occupy the second position from the outer circumferential side and the first position from the outer circumferential side inside the slots 15a. The third winding sub-portion 33 is formed by wave winding a strand of wire 30 into every sixth slot from slot numbers 1 to 91 so as to alternately occupy a third position from the outer circumferential side and a fourth position from the outer circumferential side inside the slots 15a. The fourth winding sub-portion 34 is formed by wave winding a strand of wire 30 into every sixth slot from slot numbers 1 to 91 so as to alternately occupy the fourth position from the outer circumferential side and the third position from the outer circumferential side inside the slots 15a. The strands of wire 30 are arranged to line up in a row of four strands within each slot 15a with the longitudinal direction of their rectangular cross sections aligned in a radial direction.

At a first end of the stator core 15, a first end portion 31a of the first winding sub-portion 31 extending outwards from slot number 1 and a second end portion 33b of the third winding sub-portion 33 extending outwards from slot number 91 are joined, and in addition, a first end portion 33a of the third winding sub-portion 33 extending outwards from slot number 1 and a second end portion 31b of the first winding sub-portion 31 extending outwards from slot number 91 are joined to form two turns of winding.

At a second end of the, stator core 15, a first end portion 32a of the second winding sub-portion 32 extending outwards from slot number 1 and a second end portion 34b of the fourth winding sub-portion 34 extending outwards from slot number 91 are joined, and in addition, a first end portion 34a of the fourth winding sub-portion 34 extending outwards from slot number 1 and a second end portion 32b of the second winding sub-portion 32 extending outwards from slot number 91 are joined to form two turns of winding.

In addition, a portion of the strand of wire 30 of the second winding sub-portion 32 extending outwards at the first end of the stator core 15 from slot numbers 61 and 67 is cut, and a portion of the strand of wire 30 of the first winding sub-portion 31 extending outwards at the first end of the stator core 15 from slot numbers 67 and 73 is also cut. A first cut end 31c of the first winding sub-portion 31 and a first cut end 32c of the second winding sub-portion 32 are joined to form one phase of stator winding group 161 having four turns connecting the first to fourth winding sub-portions 31 to 34 in series.

Moreover, the joint portion between the first cut end 31c of the first winding sub-portion 31 and the first cut end 32c of the second winding sub-portion 32 becomes a bridging connection connecting portion, and a second cut end 31d of the first winding sub-portion 31 and a second cut end 32d of the second winding sub-portion 32 become an output wire (O) and a neutral-point lead wire (N), respectively.

A total of six phases of stator winding groups 161 are similarly formed by offsetting the slots 15a into which the strands of wire 30 are wound one slot at a time. Then, as shown in FIG. 4, three phases each of the stator winding groups 161 are connected into star connections to form the two sets of three-phase stator winding portions 160, and each of the three-phase stator winding portions 160 is connected to its own rectifier 12. The rectifiers 12 are connected in parallel so that the direct-current output from each is combined.

Thus, the strands of wire 30 constituting the first to fourth winding sub-portions 31 to 34 are each wound into a wave winding so as to extend out of first slots 15a at end surfaces of the stator core 15, fold back, and enter second slots 15a six slots away. Each of the strands of wire 30 is also wound so as to alternately occupy the inner layer and the outer layer relative to the slot depth direction (the radial direction) in every sixth slot.

Turn portions 30a of the strands of wire 30 extend outwards from the stator core 15 and fold back to form coil ends. The turn portions 30a which are formed into substantially the same shape at both axial ends of the stator core 15 are mutually spaced circumferentially and radially, and arranged neatly in two rows circumferentially, to form coil end groups 16a and 16b.

Next, the assembly of the stator 8 will be explained with reference to FIGS. 5 to 14.

First, as shown in FIG. 5, twelve long strands of wire 30 are simultaneously bent in the same plane to form a lightning-bolt shape. Then, a wire-strand group 35A, shown in FIGS. 7A and 7B, is prepared by progressively folding the strand at right angles, as indicated by the arrow in FIG. 6, using a jig. In addition, a wire-strand group 35B including bridging connections and output wires, as shown in FIGS. 8A and 8B, is prepared in a similar manner. The wire-strand groups 35A and 35B are then annealed for ten minutes at 300° C. so that a parallelepiped core 36 mounted with the wire-strand groups 35A and 35B can be easily formed into an annular shape.

Moreover, as shown in FIG. 9, each strand of wire 30 is formed by bending it into a planar pattern in which straight portions 30b connected by turn portions 30a are lined up at a pitch of six slots (6P). Adjacent straight portions 30b are offset by a distance equal to one width (W) of the strands of wire 30 by means of the turn portions 30a. The wire-strand groups 35A and 35B are constructed by arranging six wire-strand pairs so as to be offset by a pitch of one slot from each other, each wire-strand pair consisting of two strands of wire 30 formed in the above pattern which are offset by a pitch of six slots and arranged such that straight portions 30b overlap as shown in FIG. 10. Six end portions of the strands of wire 30 each extend outwards from first and second sides at first and second ends of the wire-strand groups 35A and 35B. Furthermore, the turn portions 30a are arranged so as to line up in rows on first and second side portions of the wire-strand groups 35A and 35B.

The parallelepiped core 36 is prepared as shown in FIGS. 11A and 11B by laminating a predetermined number of sheets of SPCC material formed with trapezoidal slots 36a at a predetermined pitch (an electrical angle of 30°) and laser welding an outer portion thereof. Moreover, SPCC is a magnetic material.

As shown in FIG. 12A, the insulators 19 are mounted in the slots 36a of the parallelepiped core 36, and the straight portions of the two wire-strand groups 35A and 35B are inserted so as to stack up within each of the slots. In this manner, the two wire-strand groups 35A and 35B are installed in the parallelepiped core 36 as shown in FIG. 12B. At this time, straight portions 30b of the strands of wire 30 are housed in lines of four in a radial direction within the slots 36a and are electrically insulated from the parallelepiped core 36 by the insulators 19. The two wire-strand groups 35A and 35B are stacked one on top of the other when installed in the parallelepiped core 36 as shown in FIG. 13.

Next, the parallelepiped core 36 is rolled up and its ends abutted and welded to each other to obtain a cylindrical core 37, as shown in FIG. 12C. By rolling up the parallelepiped core 36, the slots 36a (corresponding to the slots 15a in the stator core) take on a generally rectangular cross-sectional shape, and opening portions 36b of the slots 36a (corresponding to opening portions 15b of the slots 15a) become smaller than the slot-width dimensions of the straight portions 30b. Then, the end portions of each of the strands of wire 30 are connected to each other based on the connections shown in FIG. 3 to form a stator winding groups 161. Thereafter, the cylindrical core 37 is inserted into a cylindrical outer core 38 composed of laminated SPCC material and integrated by shrink fitting to obtain the stator 8 shown in FIG. 14. The integrated body consisting of the cylindrical core 37 and the outer core 38 corresponds to the stator core 15.

In the automotive alternator constructed in this manner, electric current is supplied from a battery (not shown) through the brushes 10 and the slip rings 9 to the rotor coil 13, generating magnetic flux. The claw-shaped magnetic poles 22 of the first pole core 20 are magnetized with north-seeking (N) poles by this magnetic flux, and the claw-shaped magnetic poles 23 of the second pole core 21 are magnetized with south-seeking (S) poles. At the same time, rotational torque from the engine is transmitted through the belt and the pulley 4 to the shaft 6, rotating the rotor 7. Thus, a rotating magnetic field is applied to the polyphase stator winding 16, generating electromotive force in the polyphase stator winding 16. This alternating electromotive force passes through the rectifiers 12 and is converted into direct current, the magnitude of the voltage is adjusted by the regulator 18, and the battery is recharged.

At the rear end, external air is sucked in from the intake openings 2a disposed opposite the heat sinks of the rectifiers 12 and the heat sink 17 of the regulator 18, respectively, by rotation of the fans 5, flowing along the axis of the shaft 6, cooling the rectifiers 12 and the regulator 18, and is then deflected centrifugally by the fans 5, cooling the rear-end coil end group 16b of the polyphase stator winding 16 before being discharged to the outside through the discharge openings 2b. At the same time, at the front end, external air is sucked in axially from the intake openings 1a by rotation of the fans 5, and is then deflected centrifugally by the fans 5, cooling the front-end coil end group 16a of the polyphase stator winding 16 before being discharged to the outside through the discharge openings 1b.

In this manner, according to Embodiment 1 of the present invention, the polyphase stator winding 16 includes two sets of three-phase stator winding portions 160, each of the three-phase stator winding portions 160 being constructed by joining three phases of stator winding groups 161 into an alternating-current connection. In addition, the stator winding groups 161 are constructed by connecting the first to fourth winding sub-portions 31 to 34 in series. The first Winding sub-portion 31 is constructed by wave winding one strand of wire 30 so as to alternately occupy the first and second positions from the outer circumferential side of every sixth slot 15*a*. In other words, the first winding sub-portion 31 is constructed by wave winding one strand of wire 30 so as to alternately occupy the inner layer and the outer layer in a slot depth direction. Similarly, the second, third, and fourth winding sub-portions 32, 33, and 34 are also constructed by wave winding single strands of wire 30 so as to alternately occupy inner and outer layers in a slot depth direction.

Thus, because the first to fourth winding sub-portions 31 to 34 constituting the polyphase stator winding 16 are each composed of one strand of wire 30 (continuous wire), it is not necessary to insert a large number of short conductor segments 54 into the stator core 51 and join end portions 54*b* to each other by welding, soldering, etc., as was required in the conventional stator 50, enabling the productivity of the stator 8 to be improved significantly.

Because the coil ends are constituted by the turn portions 30*a* of the strands of wire 30, the only joints in the coil end groups 16*a* and 16*b* are the first and second end portions of the first to fourth winding sub-portions 31 to 34 and the bridging connection joint portions, significantly reducing the number of joints. Thus, because the occurrence of short-circuiting accidents which accompany loss of insulation due to the joining process can be suppressed, superior insulation can be achieved. Furthermore, the conductors are not softened by welding, raising the rigidity of the stator as a whole and enabling magnetic noise to be reduced.

The coil end groups 16*a* and 16*b* are constructed by arranging the turn portions 30*a* in rows circumferentially. Thus, compared to the conventional coil end groups in which the end portions 54*b* of the conductor segments 54 were joined to each other, the height to which the coil end groups extend outwards from the stator core 15 can be reduced. Thus, wind resistance in the coil end groups 16*a* and 16*b* is reduced, enabling the reduction of wind noise due to the rotation of the rotor 7. Coil leakage reactance in the coil ends is also reduced, improving output and efficiency.

Four strands of wire 30 are arranged so as to line up in a row radially within each slot 15*a*, and the turn portions 30*a* are arranged to line up in two rows circumferentially. Thus, the turn portions 30*a* constituting the coil end groups 16*a* and 16*b* are each divided into two rows radially, enabling the height to which the coil end groups 16*a* and 16*b* extend outwards from the stator core 15 to be reduced. As a result, wind resistance in the coil end groups 16*a* and 16*b* is reduced, enabling the reduction of wind noise due to the rotation of the rotor 7.

The turn portions 30*a* which fold back at the end surfaces of the stator core 15 each connect two straight portions 30*b* disposed in different layers in different slots 15*a* six slots apart in series. Thus, because interference between the coil ends in each phase is suppressed and the space factor of the stator winding is. increased, increased output can be achieved. Furthermore, each of the turn portions 30*a* can be easily formed into the same general shape. Because circumferential irregularities in radially inner edge surfaces of the coil end groups 16*a* and 16*b* can be suppressed by forming each of the turn portions 30*a* into the same general shape, that is, by forming the turn portions 30*a* which constitute the coil end groups 16*a* and 16*b* into the same general shape circumferentially, wind noise generated between the rotor 7 and the coil end groups 16*a* and 16*b* can be reduced. Furthermore, leak inductance becomes uniform, stabilizing output. Furthermore, because the turn portions 30*a* are spaced in the circumferential direction, and the spaces between the turn portions 30*a* in the circumferential direction are formed generally the same, the passage of cooling air inside the coil end groups 16*a* and 16*b* is facilitated, improving cooling and reducing noise due to interference between the cooling air and the coil ends.

Because the turn portions 30*a* are formed with the same general shape and arranged in rows in the circumferential direction, heat radiation from each of the turn portions 30*a* is even, and in addition, heat radiation from each of the coil end groups 16*a* and 16*b* is also even. Thus, heat generated in the polyphase stator winding 16 is radiated uniformly from each of the turn portions 30*a* and radiated uniformly from both coil end groups 16*a* and 16*b*, improving the cooling of the polyphase stator winding 16.

Because the pitch of the slots into which the strands of wire 30 are wound corresponds to the pitch between the north- and south-seeking (NS) poles of the rotor 7, the winding is a full-pitch winding, capable of large output.

Because the open dimensions of the opening portions 15*b* of the slots 15*a* are constructed so as to be smaller than the dimensions of the strands of wire 30 in the width direction of the slots 15*a*, the strands of wire 30 are prevented from popping out of the slots 15*a* towards the radial inside and noise at the opening portions 15*b* due to interference with the rotor 7 can be reduced.

Because the straight portions 30*b* are formed with a rectangular cross section, the cross-sectional shape of the straight portions 30*b* fits neatly into the shape of the slots 15*a* when the straight portions 30*b* are housed inside the slots 15*a*. Thus, the space factor of the strands of wire 30 inside the slots 15*a* is easily increased, enabling improved transfer of heat from the strands of wire 30 to the stator core 15. Here in Embodiment 1, the straight portions 30*b* are formed into a rectangular cross section, but the cross-sectional shape of the straight portions 30*b* may be any generally rectangular shape which fits neatly into the generally rectangular shape of the slots. This generally rectangular shape is not limited to a true rectangular: shape and may be a square shape, a shape consisting of four flat surfaces and rounded corners, or an elongated elliptical shape in which the short side of the rectangle are made into arcs, etc.

Because the strands of wire 30 are formed with a rectangular cross section, the surface area radiating heat from the turn portions 30*a* constituting the coil ends is increased, efficiently radiating heat generated by the polyphase stator winding 16. In addition, by disposing the long sides of the rectangular cross section parallel to the radial direction, gaps can be ensured between the turn portions 30*b*, making it possible for the cooling air to pass inside the coil end groups 16*a* and 16*b* and reducing wind resistance in the radial direction. Here in Embodiment 1, the strands of wire 30 are formed into a rectangular cross section, but the cross-sectional shape of the strands of wire 30 is not limited to a rectangular cross section and may be any generally flattened shape such as an elongated elliptical shape, etc.

The rotor 7 has sixteen magnetic poles, and ninety-six (96) slots 15*a* are formed at even pitch in the stator core 15. Because the strands of wire 30 are wave wound into every sixth slot 15*a*, the pitch of the slots into which the strands of wire 30 are wound corresponds to the pitch between the north-seeking and south-seeking poles of the rotor 7. Thus, maximum torque can be obtained, enabling the achievement of increased output.

As shown in FIG. 4, two sets of three-phase stator winding portions 160 are constructed by forming into two star connections three stator winding groups 161 each constructed by connecting the first to fourth winding subportions 31 to 34 in series, and each of these two sets of three-phase stator winding portions 160 is connected to its own rectifier 12, and in addition, the outputs from the two rectifiers 12 are connected in parallel. Thus, the direct current outputs of the three-phase stator winding portions 160 which have four turns each can be combined and extracted, enabling elimination of power generation deficiency in low rotational frequency regions.

Because the two wire-strand groups 35A and 35B which are composed of continuous wire can be lined up in two rows and inserted into the slots 15a of the stator core 15, assembly is significantly improved compared to the conventional art in which a large number of conductor segments 54 are inserted into the slots one at a time.

Increases in the number of turns in the polyphase stator winding can be easily adapted for by lining up the straight portions 30b of the wire-strand groups 35 (35A and 35B) which are composed of continuous strands of wire and installing them so that they stack up on top of each other.

The stator 8 according to Embodiment 1 can be prepared by inserting the wire-strand groups 35 which are composed of continuous wire into the slots 36a in the parallelepiped core 36 through the opening portions 36b and then rolling the parallelepiped core 36 into an annular shape. Thus, because the open dimensions of the opening portions 36b of the slots 36a can be made larger than the dimensions of the strands of wire 30 in the width direction of the slots, the operation of inserting the wire-strand groups 35 is improved. Furthermore, because the open dimensions of the opening portions 36b of the parallelepiped core 36 can be made smaller than the dimensions of the strands of wire 30 in the width direction of the slots when the parallelepiped core 36 is rolled up, the space factor is increased, enabling output to be improved. In addition, even if the number of slots is increased, the productivity of the stator will not deteriorate.

Because the height of the coil end groups 16a and 16b is low and there are not many joint portions, noise caused by interference between the coil end groups 16a and 16b and the cooling air formed by the fans 5 due to rotation of the rotor 7 is reduced. Because the shape of both coil end groups 16a and 16b is generally the same and the fans 5 are disposed on both ends of the rotor 7, the coil end groups 16a and 16b are cooled in a balanced manner, reducing the temperature of the stator winding uniformly and greatly.

Now, the fans 5 do not have to be disposed on both ends of the rotor 7, they may be disposed in consideration of the positions of the stator winding or the rectifiers which are large heat-generating bodies. For example, the coil ends of the stator winding which are large heat generating bodies can be disposed on the discharge side of a fan with a large cooling speed, and the fan being disposed on an end portion of the rotor at the end where the rectifiers are disposed. Furthermore, when mounted to an automotive engine, because the pulley is normally connected to a crankshaft by means of a belt, the fan may be disposed at the end away from the pulley so that the cooling exhaust from the fan does not affect the belt. Moreover, shoulder portions of the claw-shaped magnetic poles of the rotor have a wind conveying action, and can be used as a cooling means.

Because the direction of inclination of the strands of wire 30 constituting the inner circumferential side of the coil end group 16a is parallel to the direction of inclination of the strands of wire 30 constituting the inner circumferential side of the coil end group 16b, axial flow of cooling air through the case 3 turns along the direction of inclination of the strands of wire 30. Thus, the axial flow of the cooling air generated by the rotation of the rotor 7 is controlled.

In other words, if the strands of wire 30 constituting the inner circumferential side of the coil end groups 16a and 16b are inclined along the direction resulting from the combination of a component of the cooling air in a direction of rotation of the rotor 7 and a component of the axial flow of the cooling air, axial flow of the cooling air is promoted. Thus, because the rotor coil 13 is efficiently cooled, the temperature of the rotor coil 13 decreases, enabling the field current to be increased and output improved. In that case, because the strands of wire 30 constituting the inner circumferential side of the coil end groups 16a and 16b are inclined along the component of the axial flow of cooling air, wind noise due to interference is also reduced.

On the other hand, if the strands of wire 30 constituting the inner circumferential side of the coil end groups 16a and 16b are inclined along the direction resulting from the combination of a component of the cooling air in a direction of rotation of the rotor 7 and a component against the axial flow of the cooling air, axial flow of the cooling air is reduced. Thus, the amount of ventilation discharged radially is increased, improving the cooling of the coil ends disposed on the discharge side.

Because the axial length of the stator 8, including the coil ends, is shorter than the pole cores 20 and 21, compactness can be achieved. When fans 5 are disposed on both end portions of the rotor 7, because there are no coil ends on the discharge side of the fans, wind resistance is significantly reduced, thereby reducing wind noise, and suppressing temperature increases in internal parts requiring cooling, such as the rectifiers 12.

The number of slots housing the polyphase stator winding 16 is two per pole per phase, and there are two three-phase stator winding portions 160 each corresponding to the number of slots per pole per phase. Thus, the magnetomotive wave form can be made to approximate a sinusoidal wave, reducing higher harmonic wave components and ensuring stable output. Because the number of slots 15a is increased, teeth in the stator core 15 are slender, reducing magnetic leakage through teeth straddling the facing claw-shaped magnetic poles 22 and 23, enabling pulsation in output to be suppressed. Furthermore, because a greater number of slots 15a means a correspondingly greater number of turn portions 30a, heat radiation from the coil end groups is improved.

Because the slots 15a and the opening portions 15b are arranged to be evenly spaced at an electrical angle of 30°, magnetic pulsation which result in excitation forces which cause magnetic noise can be reduced.

Figure 15:
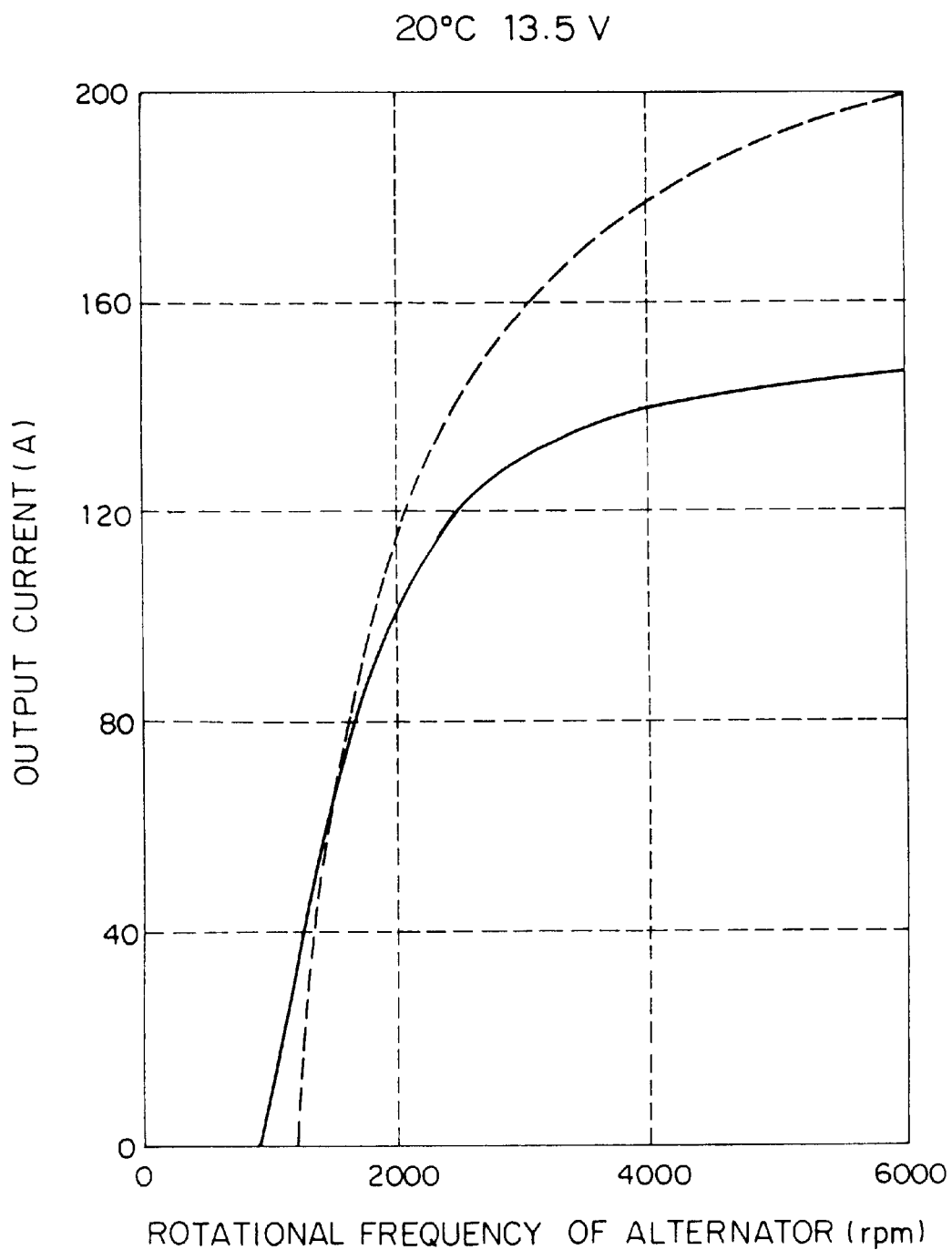
FIG. 15 is a graph showing output of the automotive alternator according to the present invention.

The solid line in FIG. 15 indicates the measured output for the automotive alternator according to Embodiment 1. Moreover, the rotor 7 and the stator 8 were prepared under the following conditions:

(1) Rotor Shape

The rotor 7 used had sixteen poles, a core length of 56 mm, and an outside diameter of 105.3 mm.

(2) Stator Shape

The stator 8 included a cylindrical stator core 15, and a polyphase stator winding 16 composed of two sets of wire-strand groups 35 (35A and 35B), in which the axial length of the stator core 15 was 36 mm, and the stator length including the coil ends was 50 mm. Ninety-six slots 15a were disposed in the stator core 15 at an even pitch of 3.75° corresponding to an electrical angle of 30°. The inner walls of the slots were generally rectangular in shape with parallel side surfaces, the distance between the side surfaces being 1.9 mm, and the depth of the slots being 11 mm. The opening width 15b of the slots 15a was 1.2 mm, the core back was 3.6 mm, and the radial thickness of the tooth end portions was 0.4 mm. In addition, insulators 19 having a thickness of 140 μm were interposed between the slots 15a and the strands of wire 30.

The stator core 15 was formed by inserting a cylindrical core 37 into a cylindrical outer core 38 then integrating the two cores 37 and 38 by shrink fitting, and had an outside diameter of 136 mm and an inside diameter of 106 mm. The cylindrical core 37 was prepared by rolling up and welding together the end portions of a parallelepiped core 36 prepared by laminating SPCC material having a plate thickness of 0.35 mm and laser welding an outside portion thereof. The opening width of the opening portions 36b of the slots 36a of the parallelepiped core 36 was 2.0 mm and the width of the core back was 1.0 mm. In order to facilitate rolling up, notches having a depth of 0.5 mm were disposed in the centers of core back portions of the slots 36a.

The outer core 38 was prepared by rolling up and welding together the end portions of a laminated body prepared by laminating SPCC material having a plate thickness of 0.5 mm and a width of 2.6 mm, and laser welding an outside portion thereof.

Copper wire material having a thickness of 1.4 mm and a width of 2.4 mm was used for each of the strands of wire 30 constituting the wire-strand groups 35. Moreover, corner portions were rounded to a curve having a radius of 0.4 mm.

Embodiment 2

Figure 16:
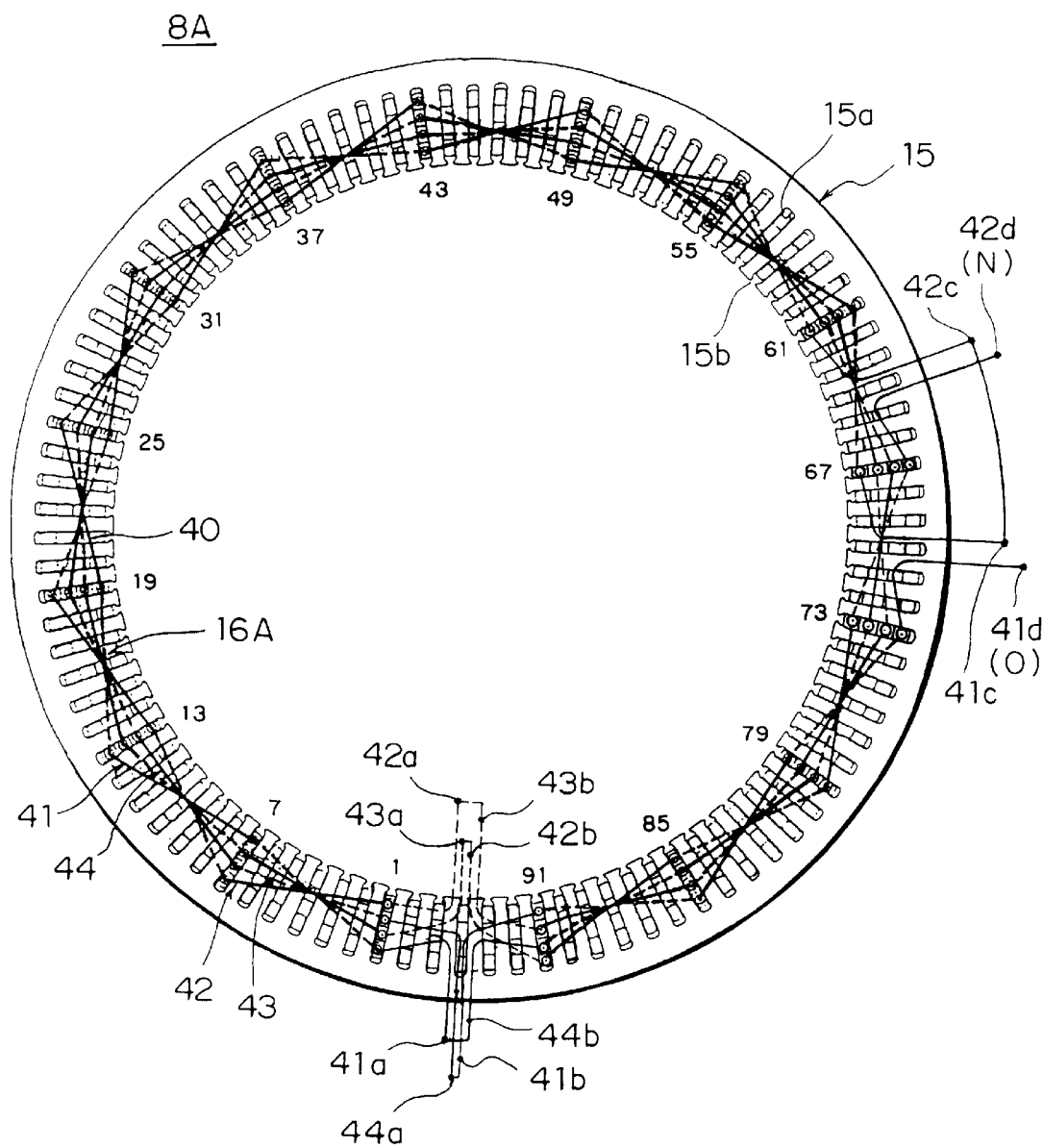
FIG. 16 is an end elevation explaining connections in one phase of stator winding group in an automotive alternator according to Embodiment 2 of the present invention.

FIG. 16 is an end elevation explaining connections in one phase of stator winding group in the automotive alternator according to Embodiment 2 of the present invention.

In FIG. 16, one phase of stator winding group 161A is constituted by first to fourth winding sub-portions 41 to 44 each composed of one strand of wire 40. Insulated copper wire material having a rectangular cross section, for example, is used in the strands of wire 40.

The first winding sub-portion 41 is formed by wave winding one strand of wire 40 into every sixth slot from slot numbers 1 to 91 so as to alternately occupy a first position from an outer circumferential side and a fourth position from the outer circumferential side inside the slots 15a. The second winding sub-portion 42 is formed by wave winding a strand of wire 40 into every sixth slot from slot numbers 1 to 91 so as to alternately occupy the fourth position from the outer circumferential side and the first position from the outer circumferential side inside the slots 15a. The third winding sub-portion 43 is formed by wave winding a strand of wire 40 into every sixth slot from slot numbers 1 to 91 so as to alternately occupy a second position from the outer circumferential side and a third position from the outer circumferential side inside the slots 15a. The fourth winding sub-portion 42 is formed by wave winding a strand of wire 40 into every sixth slot from slot numbers 1 to 91 so as to alternately occupy the third position from the outer circumferential side and the second position from the outer circumferential side inside the slots 15a. The strands of wire 40 are arranged to line up in a row of four strands within each slot 15a with the longitudinal direction of their rectangular cross sections aligned in a radial direction.

At a first end of the stator core 15, a first end portion 41a of the first winding sub-portion 41 extending outwards from slot number 1 and a second end portion 44b of the fourth winding sub-portion 44 extending outwards from slot number 91 are joined, and in addition, a first end portion 44a of the fourth winding sub-portion 44 extending outwards from slot number 1 and a second end portion 41b of the first winding sub-portion 41 extending outwards from slot number 91 are joined to form two turns of winding.

At a second end of the stator core 15, a first end portion 42a of the second winding sub-portion 42 extending outwards from slot number 1 and a second end portion 43b of the third winding sub-portion 43 extending outwards from slot number 91 are joined, and in addition, a first end portion 43a of the third winding sub-portion 43 extending outwards from slot number 1 and a second end portion 42b of the second winding sub-portion 42 extending outwards from slot number 91 are joined to form two turns of winding.

In addition, a portion of the strand of wire 40 of the second winding sub-portion 42 extending outwards at the first end of the stator core 15 from slot numbers 61 and 67 is cut, and a portion of the strand of wire 40 of the first winding sub-portion 41 extending outwards at the first end of the stator core 15 from slot numbers 67 and 73 is also cut. A first cut end 41c of the first winding sub-portion 41 and a first cut end 42c of the second winding sub-portion 42 are joined to form one phase of stator winding group 161A having four turns connecting the first to fourth winding sub-portions 41 to 44 in series.

Moreover, the joint portion between the first cut end 41c of the first winding sub-portion 41 and the first cut end 42c of the second winding sub-portion 42 becomes a bridging connection connecting portion, a second cut end 41d of the first winding sub-portion 41 and a second cut end 42d of the second winding sub-portion 42 become an output wire (O) and a neutral-point lead wire (N), respectively.

A total of six phases of stator winding groups 161A are similarly formed by offsetting the slots 15a into which the strands of wire 40 are wound one slot at a time. Then, as in Embodiment 1 above, three phases each of the stator winding groups 161A are connected into star connections to form the two sets of three-phase stator winding portions, and each of the three-phase stator winding portions is connected to its own rectifier 12. The rectifiers 12 are connected in parallel so that the direct-current output from each is combined.

Next, the assembly of a stator 8A will be explained with reference to FIGS. 17 to 22.

Figure 17:
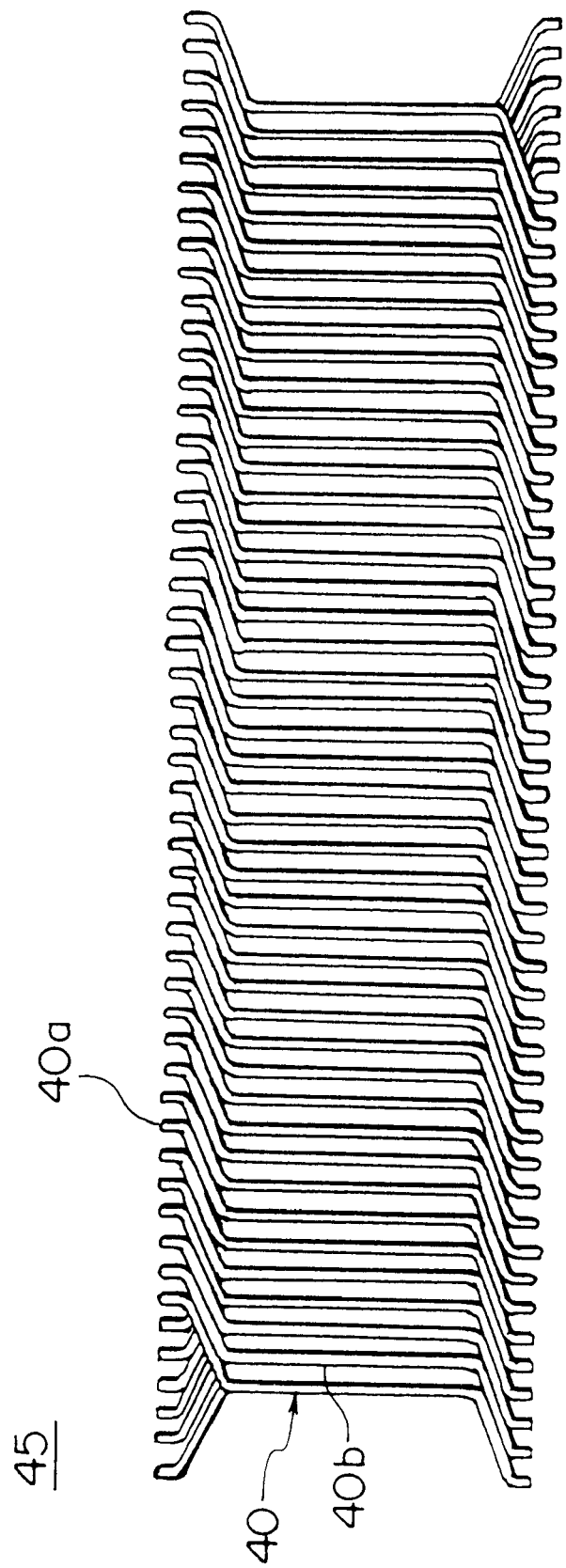
FIG. 17 is a plan showing a small winding group constituting part of the stator winding used in the automotive alternator according to Embodiment 2 of the present invention before installation.
Figure 18:
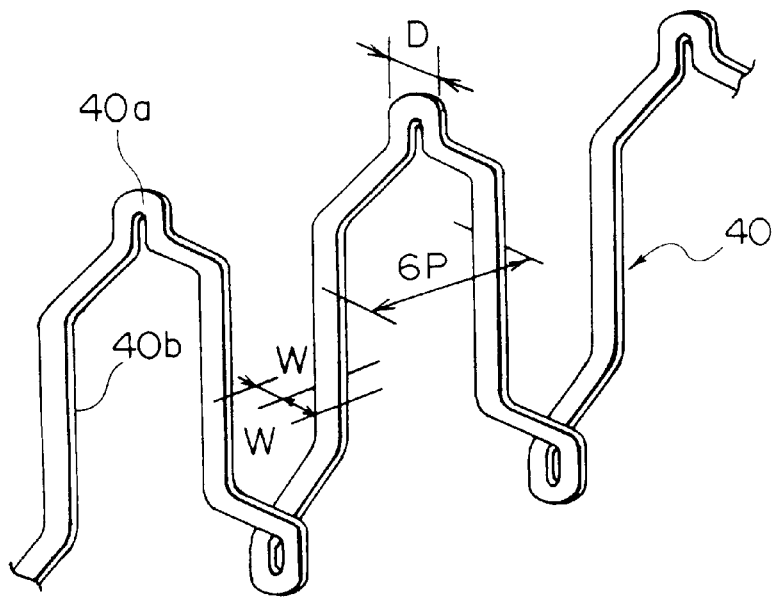
FIG. 18 is a perspective explaining the shape of a strand of wire constituting part of the small winding group shown in FIG. 17.

First, a small wire-strand group 45 is formed by bending twelve long strands of wire 40 as shown in FIG. 17. As shown in FIG. 18, each strand of wire 40 is formed by bending it into a planar pattern in which straight portions 40b connected by turn portions 40a are lined up at a pitch of six slots (6P). Adjacent straight portions 40b are offset by a distance equal to one width (W) of the strands of wire 40 by means of the turn portions 40a.

Figure 19:
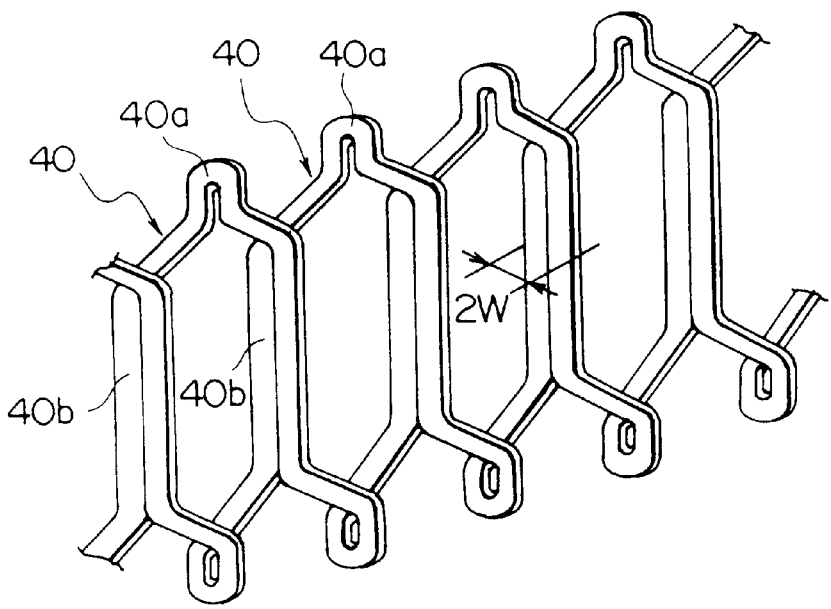
FIG. 19 is a perspective explaining arrangement of the strands of wire in the small winding group shown in FIG. 17.

The small wire-strand group 45 is constructed by arranging six small wire-strand pairs so as to be offset by a pitch of one slot from each other, each small wire-strand pair consisting of two strands of wire 40 formed in the above pattern which are offset by a pitch of six slots and arranged such that straight portions 40b overlap as shown in FIG. 19. Six end portions of the strands of wire 40 each extend outwards from a first and a second side at a first and a second end of the small wire-strand group 45. Furthermore, the turn portions 40a are arranged so as to line up in rows on first and second side portions of the small wire-strand group 45.

Figure 20:
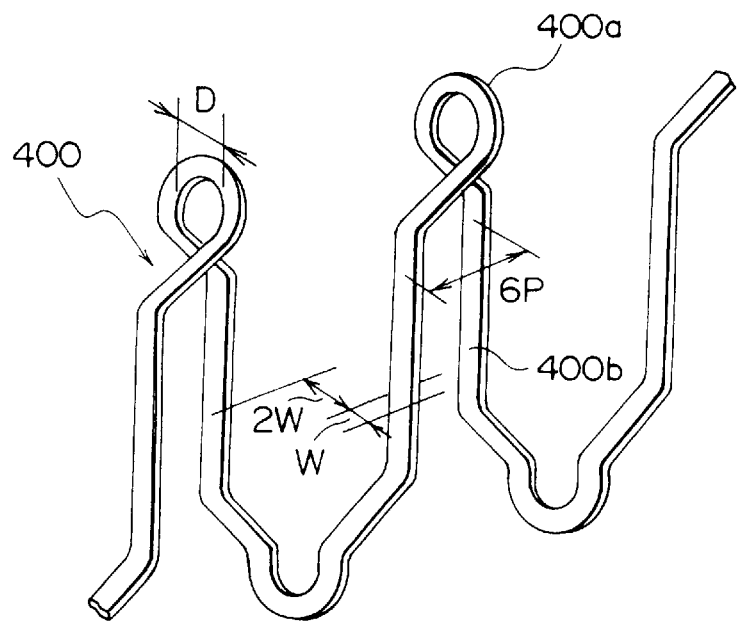
FIG. 20 is a perspective explaining the shape of a strand of wire constituting part of a large winding group constituting part of the stator winding used in the automotive alternator according to Embodiment 2 of the present invention.

Next, although not shown, a large wire-strand group is formed by bending twelve long strands of wire 400. As shown in FIG. 20, each strand of wire 400 is formed by bending it into a planar pattern in which straight portions 400b connected by turn portions 400a are lined up at a pitch of six slots (6P). Adjacent straight portions 400b are offset by substantially twice the width (2W) of the strands of wire 400 by means of the turn portions 400a. Furthermore, the inside diameter of the turn portions 400a of the strands of wire 400 constituting the large wire-strand group is formed to be generally equal to the outside diameter (D) of the turn portions 40a of the strands of wire 40 constituting the small wire-strand group 45.

Figure 21:
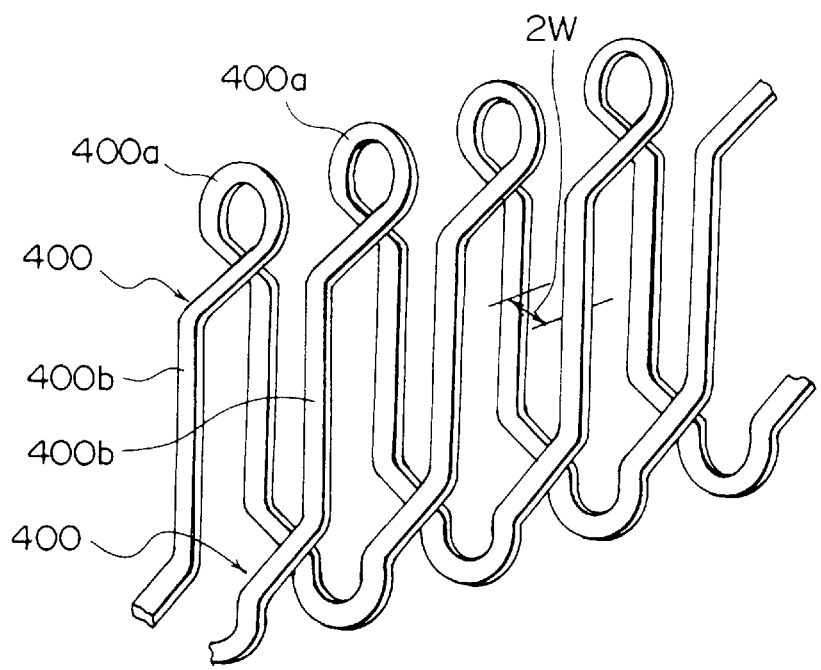
FIG. 21 is a perspective explaining arrangement of the strands of wire in the large winding group constituting part of the stator winding used in the automotive alternator according to Embodiment 2 of the present invention.

The large wire-strand group is constructed by arranging six large wire-strand pairs so as to be offset by a pitch of one slot from each other, each large wire-strand pair consisting of two strands of wire 400 formed in the above pattern which are offset by a pitch of six slots and arranged such that straight portions 400b overlap as shown in FIG. 21. Six end portions of the strands of wire 400 each extend outwards from a first and a second side at a first and a second end of the large wire-strand group. Furthermore, the turn portions 400a are arranged so as to line up in rows on first and second side portions of the large wire-strand group.

Moreover, the strands of wire 400 in the large wire-strand group are identical to the strands of wire 40 in the small wire-strand group 45. Except for differences in the diameter of the turn portions 400a, the amount of offset of the straight portions 400b and the bending direction of the turn portions, the large wire-strand group have the same construction as the small wire-strand group 45.

Figure 22:
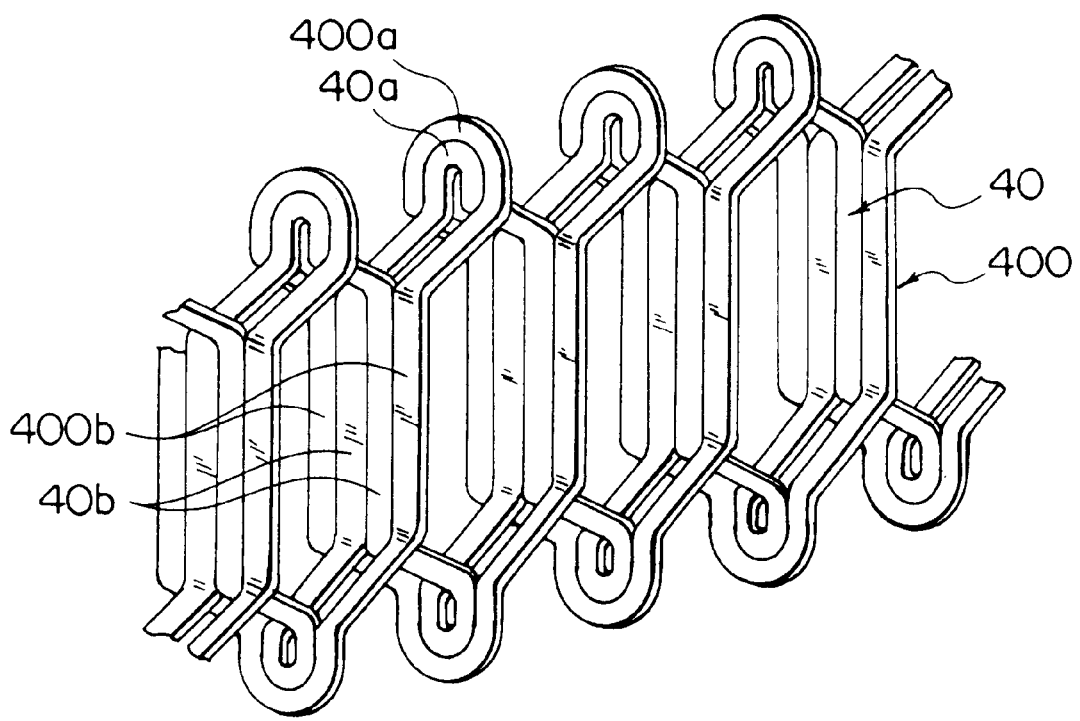
FIG. 22 is a perspective explaining arrangement of the strands of wire in the stator winding used in the automotive alternator according to Embodiment 2 of the present invention.

Next, the small wire-strand group 45 constructed in this manner is inserted inside the large wire-strand group to obtain a double wire-strand group. At this time, in the double wire-strand group, the turn portions 400a of the large wire-strand group are positioned so as to surround the turn portions 40a of the small wire-strand group 45, and the straight portions 400b of the large wire-strand group are positioned on both sides of the straight portions 40b of the small wire-strand group as shown in FIG. 22. Moreover, FIG. 22 shows part of the first to fourth winding sub-portions 41 to 44 constituting one phase of stator winding group.

Next, although not shown, insulators 19 are mounted in the slots 36a of the parallelepiped core 36, and the double wire-strand group is installed in the parallelepiped core 36 by inserting the straight portions 40b and 400b of the double wire-strand group into each of the slots 36a. In this manner, the straight portions 40b and 400b of the strands of wire 40 and 400 are housed in lines of four in a radial direction within the slots 36a and are electrically insulated from the parallelepiped core 36 by the insulators 19.

After that, the parallelepiped core 36 is rolled up and its ends abutted and laser welded to each other to obtain a cylindrical core 37. Then, the polyphase stator winding 16A is formed by connecting the end portions of the strands of wire 40 and 400 based on the connections shown in FIG. 16. Thereafter, the cylindrical core 37 is inserted into a cylindrical outer core 38 composed of laminated SPCC material and integrated by shrink fitting to obtain the stator 8A.

In the stator 8A constructed in this manner, the strands of wire 40 and 400 constituting the first to fourth winding sub-portions 41 to 44 are each wound into a wave winding so as to extend out of first slots 15a at end surfaces of the stator core 15, fold back, and enter second slots 15a six slots away. Then, the turn portions 40a and 400a of the strands of wire 40 and 400 extend outwards from the stator core 15 and fold back to form coil ends. The turn portions 40a and 400a which are formed such that the turn portions 400a of the large wire-strand group surround the turn portions 40a of the small wire-strand group 45 are arranged neatly circumferentially, to form coil-end portions 16a and 16b.

Consequently, the same effects as in Embodiment 1 can be achieved in Embodiment 2.

Furthermore, according to Embodiment 2, because the turn portions 40a and 400a are stacked in two layers and arranged in rows circumferentially, coil-end height is raised by the width of one strand of wire, but the spacing between the turn portions 40a and 400a is increased in the circumferential direction, preventing short-circuiting accidents between the strands of wire.

Furthermore, increases in the number of turns in the polyphase stator winding can be easily adapted for by winding wire-strand groups composed of continuous wire so as to stack up on top of each other in the height direction.

Embodiment 3

Figure 23:
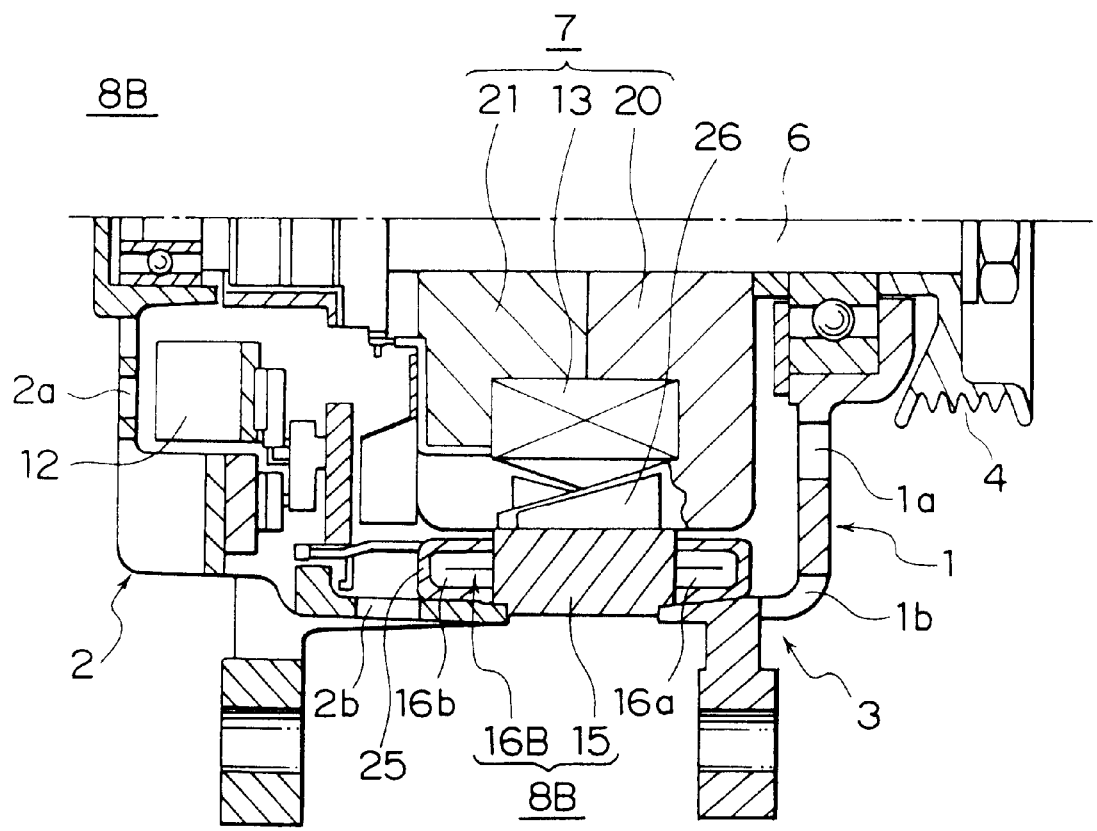
FIG. 23 is a partial cross section showing an automotive alternator according to Embodiment 3 of the present invention.
Figure 24:
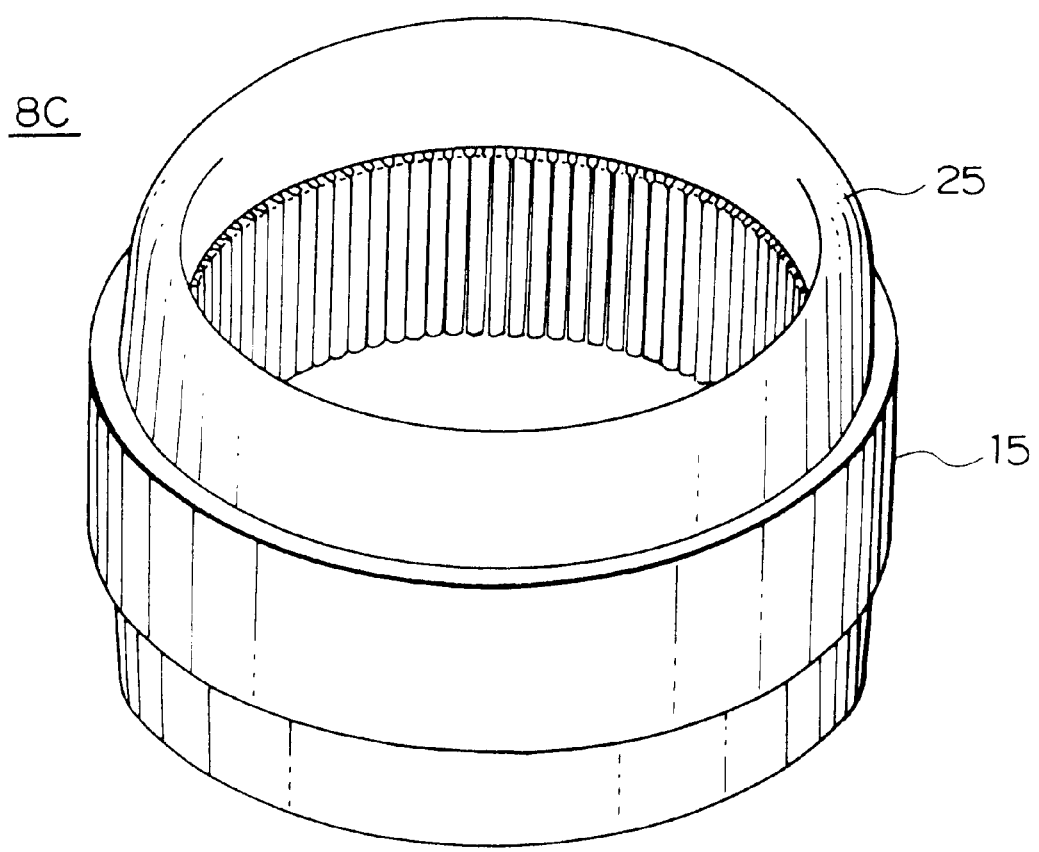
FIG. 24 is a perspective showing a stator used in the automotive alternator according to Embodiment 3 of the present invention.
Figure 25:
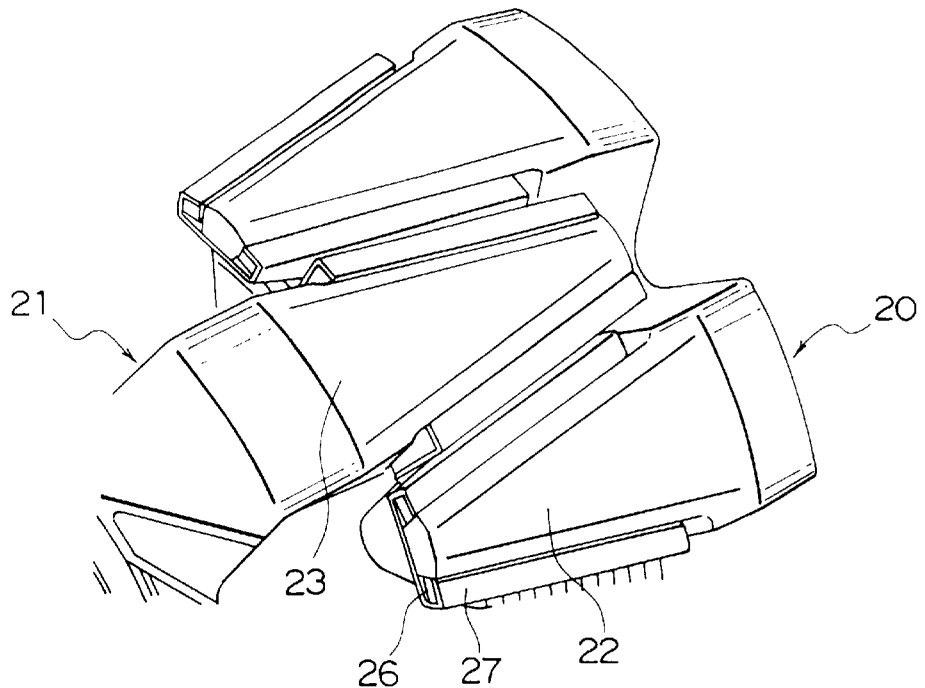
FIG. 25 is a perspective showing part of the rotor used in the automotive alternator according to Embodiment 3 of the present invention.
Figure 26:
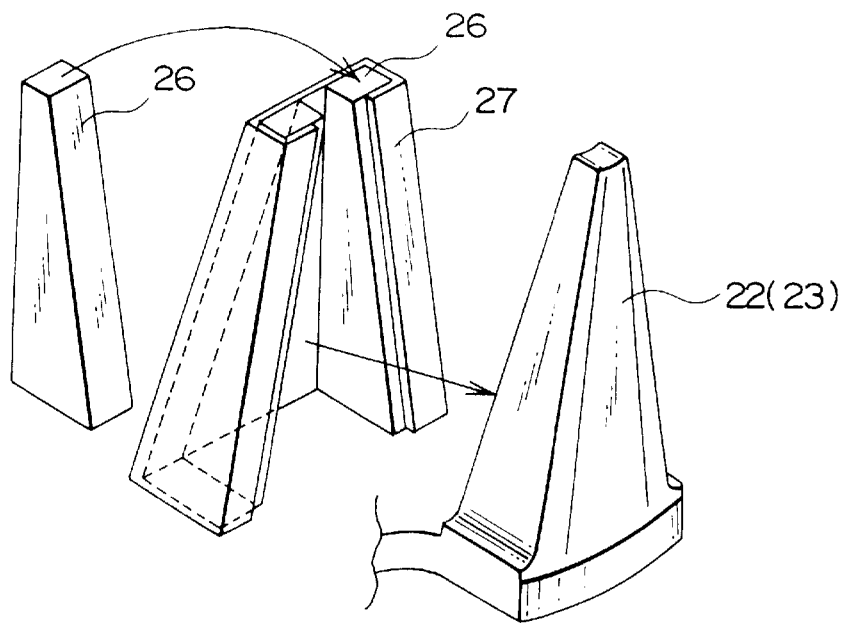
FIG. 26 is a perspective explaining the construction of the rotor used in the automotive alternator according to Embodiment 3 of the present invention.
Figure 27:
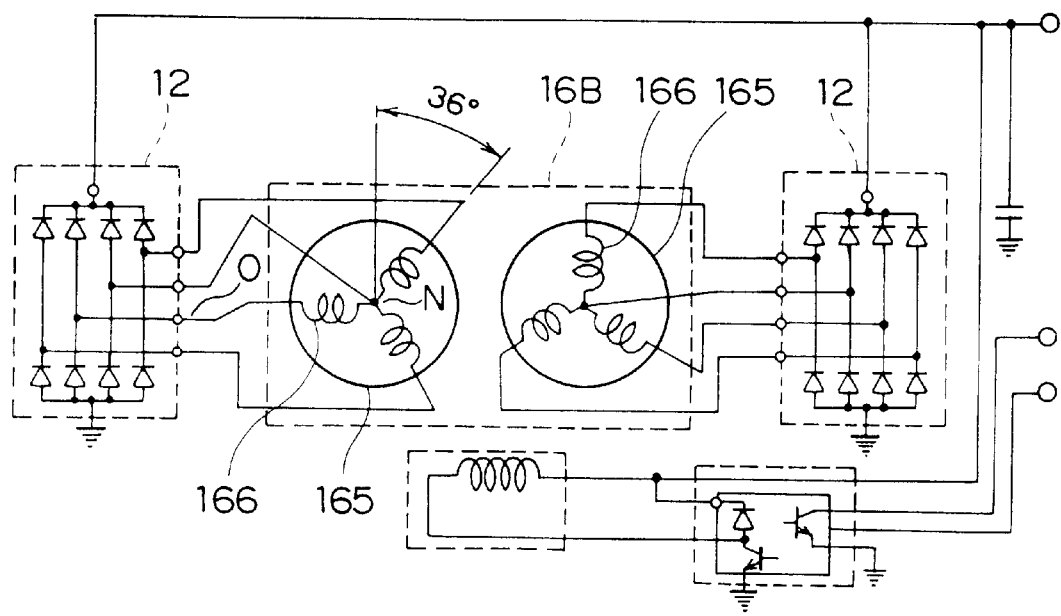
FIG. 27 is a circuit diagram for the automotive alternator according to Embodiment 3 of the present invention.
Figure 28:
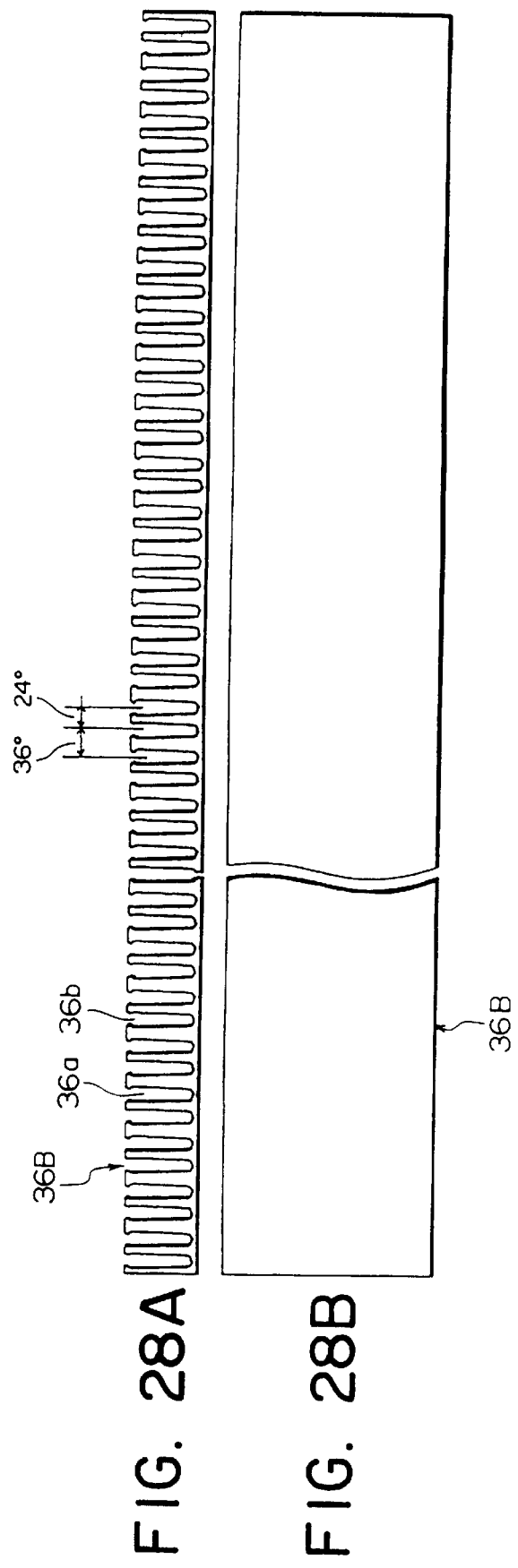
FIGS. 28A and 28B are a side elevation and a rear elevation, respectively, explaining the construction of a stator core used in the automotive alternator according to Embodiment 3 of the present invention.
Figure 29:
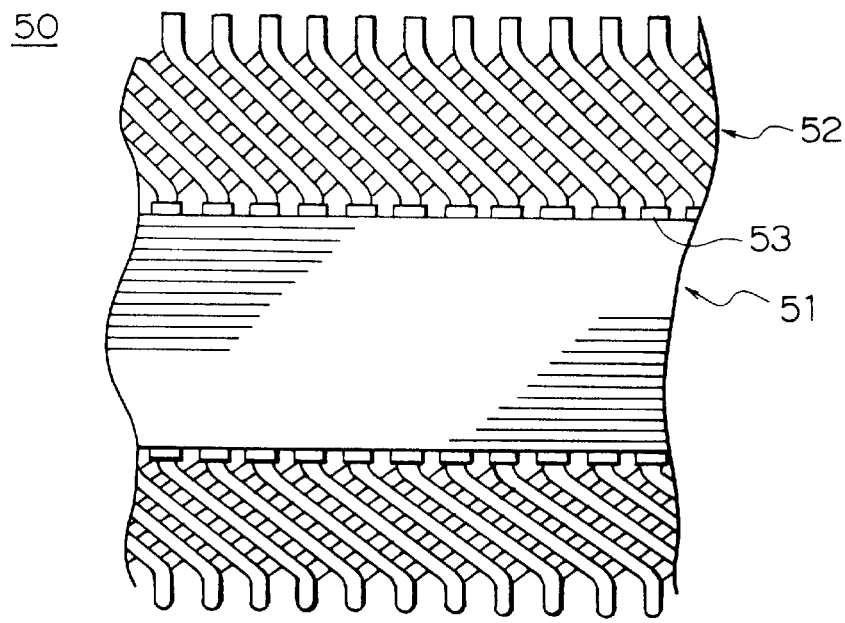
FIG. 29 is a side elevation showing part of a stator of a conventional automotive alternator.
Figure 30:
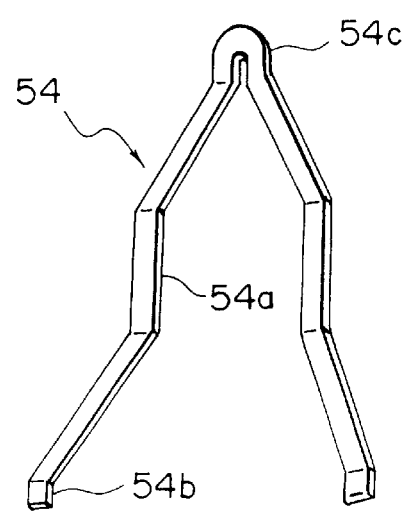
FIG. 30 is a perspective showing a conductor segment used in the stator of the conventional automotive alternator.
Figure 31:
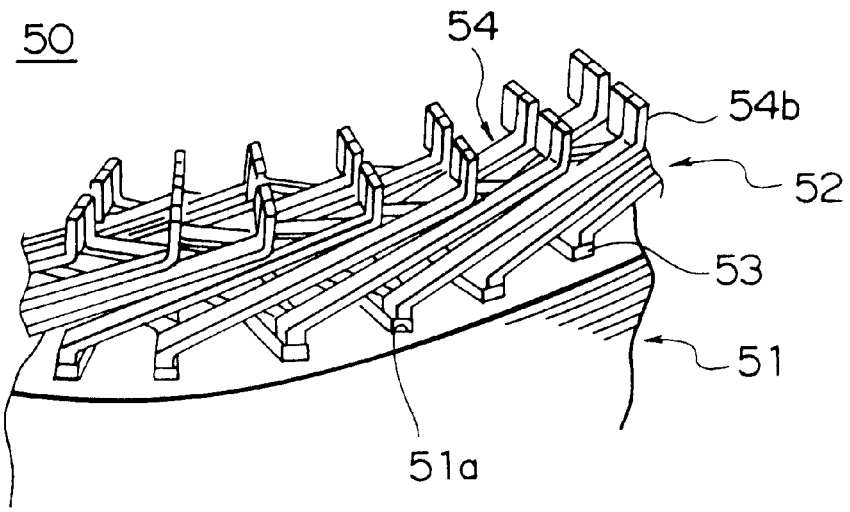
FIG. 31 is a perspective of part of the stator of the conventional automotive alternator from a front end.
Figure 32:
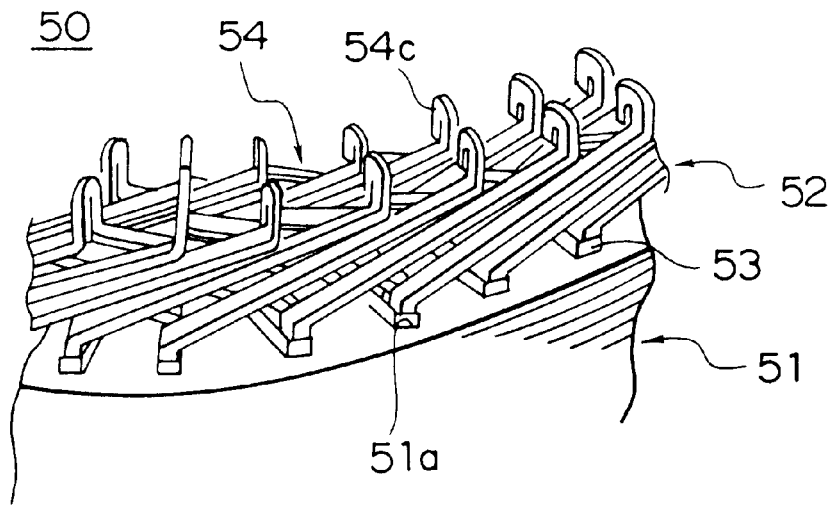
FIG. 32 is a perspective of part of the stator of the conventional automotive alternator from a rear end.

FIG. 23 is a partial cross section showing an automotive alternator according to Embodiment 3 of the present invention, FIG. 24 is a perspective showing a stator used in the automotive alternator according to Embodiment 3 of the present invention, FIG. 25 is a perspective showing part of the rotor used in the automotive alternator according to Embodiment 3 of the present invention, FIG. 26 is a perspective explaining the construction of the rotor used in the automotive alternator according to Embodiment 3 of the present invention, FIG. 27 is a circuit diagram for the automotive alternator according to Embodiment 3 of the present invention, FIGS. 28A and 28B are diagrams explaining the construction of a stator core used in the automotive alternator according to Embodiment 3 of the present invention, FIG. 28A being a side elevation and FIG. 28B being a rear elevation. Moreover, output wires are omitted from FIG. 24.

As shown in FIG. 23, in this alternator, a fan 5 is disposed only on a rear end portion of the rotor 7, and a stator 8B is mounted in contact with the case 3 by means of electrically-insulative resin 25. The electrically-insulative resin 25 is a mixture of epoxy resin (principal component) having a thermal conductivity of 0.5 (W/mk) and alumina having a thermal conductivity of 3.5 (W/mk) in a ratio of one to four (1:4).

The stator 8B is constructed such that the coil end groups 16a and 16b of a polyphase stator winding 16B wound onto a stator core 15B are integrally molded in the electrically-insulative resin 25, as shown in FIG. 24. The polyphase stator winding 16B includes two sets of three-phase stator winding portions 165 prepared by forming alternating connections among six phases of stator winding groups 166 having two turns each constructed by connecting first and second winding sub-portions 31 and 32 in series.

Magnet members are disposed on the rotor 7, permanent magnets 26 in the magnet members forming pairs on side surfaces of the claw-shaped magnetic poles 22 and 23. More specifically, as shown in FIGS. 25 and 26, the permanent magnets 26, which are shaped to follow the shape of the side surfaces of the claw-shaped magnetic poles 22 and 23, are constructed so as to envelop the radial inside of the claw-shaped magnetic poles by means of magnet holding members 27. Ferrite magnets having a thickness of 2 mm and a generally trapezoidal shape following the shape of the side surfaces of the claw-shaped magnetic poles 22 and 23 are used for the permanent magnets 26, and anisotropic magnets are chosen so that demagnetization can be suppressed even in opposing magnetic fields, whose direction is opposite to the direction of the magnetic field of the magnet 26, during maximum generation by the automotive alternator at −40° C.

As shown in FIG. 27, the circuit construction is such that three phases each of the stator winding groups 166 having two turns constructed by connecting first and second winding sub-portions 31 and 32 in series are connected into star connections to constitute the two sets of three-phase stator winding portions 165, each of the two sets of three-phase stator winding portions 165 is connected to its own rectifier 12, and the rectifiers 12 are connected in parallel so that the direct-current output from each is combined. In addition, the neutral points of the star connections of the three-phase stator winding portions 165 are connected to the rectifiers 12.

As shown in FIGS. 28A and 28B, the slots 36a in the parallelepiped core 36B are disposed at a pitch corresponding to an electrical angle of 30°, the opening portions 36b being alternately disposed at an electrical angle of 36° and an electrical angle of 24°. Thus, the phase difference between the two sets of three-phase stator winding portions 165 is 36°. Moreover, the phase difference between the two sets of three-phase stator winding portions 160 in Embodiment 1 is 30°.

Since the number of turns in the stator in Embodiment 3 is the minimum number of turns allowing maximum space factor within the slots for this winding construction, namely two, the rotational frequency at which the alternator generates output is quite high, and consequently when the alternator is at a low rotational frequency up to 2500 rpm, output is deficient. The permanent magnets 26 are interposed between the claw-shaped magnetic poles 22 and 23, as explained above, to supplement this, ensuring power induction by suppressing flux leakage between the poles, and in addition, by suppressing unnecessary output by supplying maximum field current to the field coils during low-speed rotation and instead limiting the field current during high-speed rotation of 2500 rpm or more, the temperature of the stator and the rectifiers can be kept within tolerable values. In the case of this embodiment, field current supplied to the field coils is controlled so as to be kept below 7.5 A during low-speed rotation, and below 4.0 A during high-speed rotation.

Now, the output for the automotive alternator according to Embodiment 3 of the present invention is indicated by the broken line in FIG. 15. From FIG. 15, it can be seen that although the rotational frequency at which output is generated is quite high compared to Embodiment 1, since impedance is significantly lower due to reduced copper loss as a result of using two turns and reduced stator temperature as a result of the thermally conductive construction, output rises rapidly and greatly outperform Embodiment 1 when the alternator is at a rotational frequency of between 2000 to 2500 rpm, which corresponds to idling rotation of the automotive engine, and 5000 rpm.

According to the construction of Embodiment 3, output can be ensured during low-speed by supplying a maximum amount of field current which supplies a magnetic field to the magnetic poles in the rotor when output is required during low-speed rotation and by interposing permanent magnets between the magnetic poles of the rotor. Consequently, the number of turns in the stator can be reduced to the minimum two turns, enabling reduction of the temperature of the stator coil which is the portion of the alternator which generates the most heat, also enabling loss in the stator to be suppressed, and improving the output and efficiency of the alternator. At the same time, because the neutral points of the star-connected three-phase stator winding portions 165 are connected to the rectifiers, when the alternator is at a high rotational frequency, output can be efficiently extracted from the neutral point voltage.

For cooling as well, because the resin 25 included in the stator coil ends contains a component with a higher thermal conductivity than the principal component of the resin itself and is disposed in contact with the brackets, heat from the coils can be transferred to the low-temperature brackets, enabling the temperature of the coils to be reduced. Moreover, by giving the coil-end resin a shape like cooling fins, the temperature of the coils can be reduced further.

Moreover, as an additional effect due to sealing by the resin, whereas the brackets normally require a certain amount of insulating distance from the stator winding because the brackets are ground, due to the seal formed by the resin, the insulating distance can be shortened, and the alternator can be made compact if the resin is placed in contact with the brackets as in this Embodiment 3.

Furthermore, because the opening portions of first and second slots into which the first and second winding portions are inserted are given pitches corresponding to electrical angles of 36° and 24° in order to suppress higher harmonic components of magnetomotive force in the stator as a measure against magnetic noise, the fifth harmonic component can be reduced. Moreover, since varying the pitch in the circumferential direction in this manner makes the thickness of the teeth nonuniform and gives the teeth an ultra-thin shape, the rigidity of the teeth is reduced significantly in the circumferential direction. Consequently, the conventional bending of conductor segments in the circumferential direction produces deformation of the teeth, leading to deterioration in output and magnetic noise. Because the continuous winding of the present construction is inserted radially, there is no deleterious effect on workability in particular.

By the present construction, because the workability of the winding is markedly improved, magnetic noise and stator loss are reduced, and cooling is markedly improved by the resin heat-transfer construction as explained above, the fan at the end away from the rectifiers can be dispensed with, and together with the smoothing of the coil ends due to the resin, interference noise can be markedly reduced.

Moreover, in the two turn construction of Embodiment 3, when the output-generating rotational frequency is insufficient, the two sets of three-phase stator winding portions may also be connected in parallel and rectified together. In this manner, the number of turns of the conductor housed in the slots can be doubled if the required output is not being met.

In Embodiment 3, the coil end groups are sealed by the resin 25, but the bridging connection portions and neutral point joint portions which protrude from several places on the coil ends may also be resin-sealed in the same manner. By this construction, the insulation of these connecting portions can be ensured, and because this molding secures them, wire breakages due to vibration are eliminated, improving quality.

Moreover, in each of the above embodiments, the fans 5 are disposed inside the case 3, but a fan may also be disposed outside the automotive alternator so as to rotate together with the rotation of the rotor.

Each of the above embodiments has been explained for four turns or two turns, but when even lower-speed output is required six turns or eight turns may be used. Such cases can also be adapted to simply by inserting winding groups into the stator core so as to stack up radially. Naturally, odd numbers of turns may also be used.

Each of the above embodiments has been explained for use in an alternator with full-pitch windings, but the present constructions may also be used in an alternator with short-pitch windings (i.e., not full-pitch windings).

Each of the above embodiments can also be used in automotive alternators of the type in which the rotor coil is secured to a bracket and a rotating magnetic field is supplied across an air gap.

In each of the above embodiments, the number of slots in the stator was ninety-six slots for sixteen magnetic poles, but three phases and seventy-two slots for twelve magnetic poles, 120 slots for twenty poles, etc., may also be adopted. Furthermore, in the case of one slot per pole per phase, there may also be forty-eight slots for sixteen poles, thirty-six slots for twelve poles, sixty slots for twenty poles, etc. In the case of Embodiment 3 in particular, where there are only two turns in the stator winding, it is preferable to have a larger number of poles.

In each of the above embodiments, the outer circumferential core of the stator core was constructed as a laminated body of SPCC material, but a pipe-shaped solid body outer core may also be used.

The slot opening portions may also be narrowed after insertion of the winding groups into the slots of the parallelepiped core by plastically deforming the tooth ends by pressing them with a jig in a radial direction.

In each of the above embodiments, the axial length of the stator including the coil ends was shorter than the axial length of the rotor, but the present invention may also be used in an alternator constructed such that the axial length of the stator including the coil ends is longer than the axial length of the rotor. In that case, because the coil ends are disposed on the discharge side of the fans, temperature increases in the stator can be suppressed.

Each of the above embodiments used a Lundell-type rotor having claw-shaped magnetic poles, but the same effects can be achieved using a salient-type rotor having projecting magnetic poles.

In each of the above embodiments, centrifugal fans were used for the fans 5, but the same effects can be achieved using axial flow fans or inclined flow fans which give rise to an axial component because even axial flow fans and inclined flow fans have a centrifugal component.

In each of the above embodiments, there is a risk that a portion of the insulation at apex portions of the turn portions may be damaged during formation of the wire-strand groups, but since sufficient distance is ensured between the apex portions of the turn portions, short-circuiting problems are rare.

In Embodiment 1 above, because each phase of the stator winding is composed of inner-layer and outer-layer wire-strand groups having two turns each, the shape and sectional area of the conductors in the inner-layer and outer-layer wire-strand groups can be changed. In that case, it is better to reduce the conductors of the wire-strand groups on the side nearest to the rotor, where the cooling is good, that is on the inner-layer side. According to this construction, the sectional area of the core, which is part of a magnetic circuit, may be increased proportionate to the reduction in the sectional area of the conductors. Furthermore, the costs of copper, which is the conductor material, can be reduced.

In each of the above embodiments, the rectifiers are disposed at the end of the rotor away from the pulley and the fan is disposed at the same end, but the fan may also be disposed at the end near the pulley. When there is no particular problem with the temperature of the rectifiers, the fan may also be disposed at the end away from the pulley. Because the height of the coil ends of the stator is low, wind resistance on the discharge side in the wind channel of the fan is significantly reduced, increasing the overall amount of ventilation. Consequently, suitable relative positions for the rectifiers, the pulley, and the fans may also be selected in consideration of the position where the alternator is mounted on the engine, of wind noise, of magnetic noise, and of the temperature conditions of each portion.

In each of the above embodiments, the winding is formed with the strands of wire spaced, but because the strands of wire are coated with insulation, the winding may also be formed with the strands of wire completely in close proximity to each other. According to this construction, the density of the coil ends can be further increased, enabling the dimensions thereof to be further reduced. Furthermore, because by reducing the gaps between the strands of wire irregularities are also reduced, enabling wind noise to be reduced further. Because the rigidity of the winding is also increased by contact between the strands of wire, short-circuiting between the strands of wire and between the strands of wire and the core due to vibration can be reduced and magnetic noise can also be reduced. Because heat transfer between the strands of wire is improved, the temperature of the strands of wire becomes more uniform, further reducing the temperature of the stator.

In each of the above embodiments, the insulators are inserted on the stator core side before the insertion of the wire-strand groups into the core, but the insulators may also first be wrapped around the portions of the strands of wire to be housed in the slots and inserted into the core together with the wire-strand groups. Furthermore, a long strip of insulators may be placed on top of the parallelepiped core and the wire-strand groups inserted form above such that the insulators are simultaneously inserted into and housed inside the slots together with the wire-strand groups. In that case, at a later stage, the protruding insulators may be removed together in one step. In addition, the portions of the strands of wire to be housed in the slots may be pre-molded with insulating resin. In that case, mass-producibility is significantly improved.

In each of the above embodiments, the annular core prepared by rolling up the parallelepiped core is inserted into the outer core, then the two cores are integrated by shrink fitting, but the annular core prepared by rolling up the parallelepiped core may be integrated with the outer core by press fitting the former into the latter.

In each of the above embodiments, the stator core was formed by inserting the annular core 37 having a core back width of 1.0 mm into the outer core 38 having a core back width of 2.6 mm and then shrink fitting the two cores 37 and 38, but the annular core having a core back width of 3.6 mm may be prepared, in which case the outer core 38 may be omitted. In the case where the stator core was formed by inserting the annular core 37 into the outer core 38 then shrink fitting the two cores 37 and 38, a gap between the annular core 37 and the outer core 38 is made, causing output to deteriorate, and the rigidity of the stator core is reduced, causing magnetic noise to worsen. In the case where the stator core was formed with only the annular core having a core back width of 3.6 mm, there is no abovementioned output deterioration due to the gap between the annular core and the outer core, and there is no rigidity deterioration in the stator core due to constituting the stator core with the annular core and the outer core, enabling increase in magnetic noise to be suppressed.

In each of the above embodiments, copper wire material having a rectangular cross section is used in the strands of wire, but the strands of wire are not limited to copper wire material having a rectangular cross section, and may, for example, be a copper wire material having a circular cross section. In that case, formability of the strands of wire is enhanced, facilitating easy placement and connection of the strand of wire, and improving the workability. Further, the strands of wire are not limited to copper wire material, and may, for example, be an aluminium wire material.

In each of the above embodiments, four strands of wire are arranged so as to line up in a row radially within each slot and the turn portions are arranged to line up in two rows circumferentially, but six strands of wire may be arranged so as to line up in a row radially within each slot and the turn portions may be arranged to line up in three rows circumferentially, and further eight strands of wire are arranged so as to line up in a row radially within each slot and the turn portions are arranged to line up in four rows circumferentially. Because the more the number of the strands of wire lined up in a row radially within each slot and the number of the rows of the turn portions lined up circumferentially increase the more the number of the connection portions increase, the present invention can be used for the construction such that a large number of the strands of wire are arranged so as to line up in a row radially within each slot and the turn portions are arranged so as to line up in a large number of rows circumferentially.

The present invention is constructed in the above manner and exhibits the effects described below.

According to one aspect of the present invention, there is provided an alternator comprising:

a rotor for forming north-seeking (N) and south-seeking (S) poles along a rotational circumference;

a stator comprising:
  a stator core disposed facing the rotor; and
  a polyphase stator winding installed in the stator core; and a bracket supporting the rotor and the stator, wherein the stator core comprises a laminated iron core formed with a number of slots extending axially at a predetermined pitch in a circumferential direction, the polyphase stator winding comprises a number of winding sub-portions in each which a long strand of wire is wound so as to alternately occupy an inner layer and an outer layer in a slot depth direction within the slots at intervals of a predetermined number of slots, the strand of wire folding back outside the slots at axial end surfaces of the stator core to form turn portions, and the turn portions align in a circumferential direction to constitute coil end groups.

Thus, because a major portion of the polyphase stator winding is composed of continuous wire and joint portions are significantly reduced in number compared to when conductor segments are used, it is possible to achieve superior insulation and reduce interference noise due to rotation of the rotor. Because the density of the coil ends can be increased, the height of the coil ends can be reduced, making space efficiency superior. Furthermore, coil leakage reactance in the coil ends is reduced, improving output and efficiency. Because there is no softening of the conductors due to welding, rigidity of the stator is increased, reducing magnetic noise. Because the conventionally-required steps of inserting and joining a large number of conductor segments can be omitted, operability is significantly improved.

2n strands of the strands of wire may be disposed in a row in the depth direction in each of the slots, and the turn portions of the strands of wire may be arranged so as to align into n rows in a circumferential direction, reducing the height of the coil ends and making space efficiency superior.

2n strands of the strands of wire may be disposed in a row in the depth direction in each of the slots, and the turn portions of the strands of wire may be arranged so as to stack up into n layers, increasing the distance between the turn portions, thereby suppressing short-circuiting between the strands of wire.

The turn portions constituting the coil end groups at at least one axial end portion of the stator core may be formed with a generally identical shape in a circumferential direction, whereby circumferential irregularities in the turn portions are reduced, making space efficiency superior, leakage inductance is made uniform, enabling stable output, and the generation of heat is made uniform, making the temperature uniform and reducing the overall temperature of the stator winding.

Spaces between adjacent turn portions in the coil end groups at at least one axial end portion of the stator core may be formed so as to be generally identical in a circumferential direction, allowing ventilation to pass through uniformly, thereby improving cooling, and making wind resistance uniform in the circumferential direction, thereby reducing wind noise.

Each of the turn portions constituting the coil end groups may comprise a uniform heat-radiating portion, providing the polyphase stator winding with uniform heat-radiating portions corresponding to the slots. Thus, because the heat radiation is well balanced, the temperature is uniform, and coil loss is reduced, output and efficiency are improved. Moreover, the generation of heat is made uniform, making the temperature uniform and reducing the overall temperature of the stator winding.

The pitch of the slots into which the strands of wire wound may correspond to the pitch of the north-seeking (N) and south-seeking (S) poles of the rotor. Thus, the polyphase stator winding becomes a full-pitch winding corresponding in pitch to the north-seeking (N) and south-seeking (S) poles of the rotor, enabling greater output.

Opening portions of the slots may be formed at a uneven pitch, enabling stator magnetomotive force higher harmonics and slot harmonic to be reduced, reducing pulsation in magnetic flux, and providing stable output and reduced magnetic noise.

Opening dimensions of the opening portions of the slots may be smaller than dimensions of the strands of wire in a slot-width direction, preventing the strands of wire, from popping out of the slots and reducing noise due to interference between the opening portions and rotor.

The cross-sectional shape of the strands of wire within the slots may be a rectangular shape following the shape of the slots. The space factor in the slots is thereby increased, improving output and efficiency. Furthermore, the contact surface area between the strands of wire and the stator core is increased, increasing thermal conductivity, further reducing the temperature of the stator winding. Movement of the strands of wire within the slots is also prevented, suppressing damage to the insulation.

The cross-sectional shape of the strands of wire may be a generally flattened shape. The space factor in the slots is thereby increased and heat radiation from the stator winding is improved, improving output and efficiency.

The turn portions of the strands of wire constituting the coil end groups may be provided with resin, reliably preventing short-circuiting between the turn portions, and suppressing the infiltration of foreign matter and liquids. The stator core and the stator winding are also reliably fastened to each other, providing superior resistance to vibration.

The resin provided to the turn portions constituting the coil end groups may contain a component having a higher coefficient of thermal conductivity than the a principal component of the resin, improving electrical insulation by the resin without reducing cooling of the stator winding, and also preventing infiltration by foreign matter. Furthermore, irregularities in the coil ends are also eliminated, reducing wind noise. Electrical insulation can be ensured between the stator winding and the bracket which is ground, enabling the distance between the bracket and the stator winding to be reduced, enabling size to be reduced.

The resin may placed in contact with the bracket, enabling size to be reduced and also enabling heat generated by the stator winding to be transferred to the low-temperature bracket, reducing the temperature of the stator winding and enabling output to be increased.

A rectifier may be disposed at one axial end of the stator, the rectifier being electrically connected to winding ends of the polyphase stator winding and converting alternating-current output from the polyphase stator winding into direct current, wherein the rotor comprises a Lundell-type rotor core having a number of claw-shaped magnetic poles providing the north-seeking (N) and south-seeking (S) poles; and a cooling means for supplying cooling air inside the bracket by rotation of the rotor, whereby the coil end groups and the rectifier are cooled by passage of the cooling air inside the bracket. Thus, noise due to interference between the coil ends and the cooling air generated by the claw-shaped magnetic poles due to rotation of the rotor is reduced, coil end height is reduced, wind resistance against the cooling air is reduced, and the cooling of the rotor and the rectifier is improved.

The cooling means may be a fan disposed on at least one axial end portion of the rotor core. Because the coil ends are uniform in shape and reduced in size and the speed of the cooling air is increased on the discharge side of the fan, noise due to interference between the coil end groups and cooling air generated by the fan is reduced. In addition, due to the cooling effects of the fan, the temperature of the coil ends decreases, reducing coil resistance and improving output.

The fans may be disposed on both axial end portions of the rotor core, enabling well-balanced cooling of the coil ends at both axial ends of the stator core, making the temperature of the stator winding uniform and greatly reducing the same. In addition, due to the cooling effects of the fans at both ends of the stator winding, the temperature of the coil ends decreases, reducing coil resistance and improving output.

The axial length of the stator including the coil end groups may be shorter than the axial length of the rotor core, enabling size to be reduced.

Directions of inclination of the strands of wire constituting inner circumferential sides of the coil end groups may be parallel at both axial ends of the stator. Thus, the axial flow of the cooling air inside the bracket revolves in the direction of inclination of the strands of wire constituting the inner circumferential sides of the coil end groups, enabling the axial flow generated by rotation of the rotor to be controlled.

The number of slots housing the polyphase stator winding may be two per pole per phase; and the polyphase stator winding may comprise a first polyphase winding portion and a second polyphase winding portion each corresponding to one slot per pole per phase, making the magnetomotive wave form approximate a sinusoidal wave, thereby reducing harmonic components and enabling stable output. Furthermore, the number of slots is increased, and the teeth become thinner, enabling the reduction of magnetic leakage in teeth straddling the gap between two adjacent claw-shaped magnetic poles on the facing rotor, thereby suppressing pulsations in output. Because the number of slots is increased, the number of turn portions increases proportionately, improving heat radiation from the coil ends.

The first polyphase winding portion and the second polyphase winding portion may be connected in series and winding ends thereof may be connected to the rectifier, enabling the number of conductors to be doubled if the number of conductors housed in the slots is insufficient to provide the required output.

The rectifier may comprise a first rectifier for converting alternating-current output from the first polyphase winding portion and a second rectifier for converting alternating-current output from the second polyphase winding portion, output from the first polyphase winding portion and the second polyphase winding portion being combined after being converted separately by the first and second rectifiers, enabling the polyphase winding portions to generate output stably without affecting each other. Furthermore, because conversion is performed by two rectifiers, the combined output is large, providing particular advantage over single rectifiers for cases in which diode temperature would exceed a tolerable level.

Each of the first and second polyphase winding portions may be a three-phase connection, opening portions of slots constituting a slot group into which the first polyphase winding portion is inserted and opening portions of slots constituting a slot group into which the second polyphase winding portion is inserted being arranged at an even pitch corresponding to an electrical angle of 30°, reducing magnetic pulsation forces which cause magnetic noise resonance.

Each of the first and second polyphase winding portions may a three-phase connection, opening portions of slots constituting a slot group into which the first polyphase winding portion is inserted and opening portions of slots constituting a slot group into which the second polyphase winding portion is inserted being arranged so as to alternate between an electrical angle of ($\alpha°$) and an electrical angle of ($60°-°$), enabling reduction of mutual harmonic components in the first and second polyphase winding portions.

At least one of the first and second polyphase winding portions may be a star-connection and a neutral point of the star connected polyphase winding portion may be connected to the rectifier, whereby output can be extracted from the neutral point voltage of the star-connected stator winding portion when the alternator is rotating at high speed because the neutral point is connected to the rectifier.

The field current flowing to a field coil for supplying a magnetic field to the claw-shaped magnetic poles may be limited when rotational frequency of the alternator is greater than or equal to a predetermined value, preventing excessive output by the alternator during high-speed rotation by suppressing the field current.

Magnets may be interposed between the claw-shaped magnetic poles, improving the magnetomotive force of the rotor and thereby improving output.

What is claimed is:

1. An alternator comprising:
    a rotor for forming north-seeking (N) and south-seeking (S) poles about a rotational circumference;
    a stator comprising:
        a stator core disposed facing said rotor; and
        a polyphase stator winding installed in said stator core; and
    a bracket supporting said rotor and said stator,
    wherein said stator core comprises a laminated iron core formed with a number of slots extending axially at a predetermined pitch in a circumferential direction,
    said polyphase stator winding comprises a number of winding sub-portions in each which a long strand of wire is wound so as to alternately occupy an inner layer and an outer layer in a slot depth direction within said slots at intervals of a predetermined number of slots, said strand of wire folding back outside said slots at axial end surfaces of said stator core to form turn portions, and
    said turn portions align in a circumferential direction to constitute coil end groups at both axial end portions of said stator core,
        wherein said number of winding sub-portions are constructed with at least one winding assembly formed by simultaneously bending and folding a plurality of said strand of wires,
        wherein said winding assembly is constructed by arranging at one slot pitch offset the same number of wire-strand pairs as said predetermined number of slots, each of said wire-strand pairs constructed by arranging two strands of said strands of wire so that straight portions alternately overlap at a predetermined pitch, each of said strands of wire being formed into a pattern in which said straight portions are connected by turn portions so as to be arranged at a pitch of said predetermined number of slots and adjacent straight portions are offset by said turn portions so as to alternately occupy said inner layer and said outer layer in said slot depth direction, and by extending each end portion of said strands of wire on both sides of both ends of said winding assembly and arranging the same number of pairs of said overlapping straight portions as the number of said slots at said one slot pitch.

2. The alternator according to claim 1 wherein said turn portions constituting said coil end groups at at least one axial end portion of said stator core are formed with a generally identical shape in a circumferential direction.

3. The alternator according to claim 1 wherein spaces between adjacent turn portions in said coil end groups at at least one axial end portion of said stator core are formed so as to be generally identical in a circumferential direction.

4. The alternator according to claim 1 wherein each of said turn portions constituting said coil end groups comprises a uniform heat-radiating portion.

5. The alternator according to claim 1 wherein a pitch of said slots into which said strands of wire are wound corresponds to a pitch of said north-seeking (N) and south-seeking (S) poles of said rotor.

6. The alternator according to claim 1 wherein opening portions of said slots are formed at a uneven pitch.

7. The alternator according to claim 1 wherein opening dimensions of said opening portions of said slots are smaller than dimensions of said strands of wire in a slot-width direction.

8. The alternator according to claim 1 wherein a cross-sectional shape of said strands of wire within said slots is a rectangular shape following a shape of said slots.

9. The alternator according to claim 1 wherein a cross-sectional shape of said strands of wire is a generally flattened shape.

10. The alternator according to claim 1 wherein said turn portions of said strands of wire constituting said coil end groups are provided with resin.

11. The alternator according to claim 10 wherein said resin provided to said turn portions constituting said coil end groups contains a component having a higher coefficient of thermal conductivity than a principal component of said resin.

12. The alternator according to claim 11 wherein said resin is placed in contact with said bracket.

13. The alternator according to claim 1, further comprising a rectifier disposed at one axial end of said stator, said rectifier being electrically connected to winding ends of said polyphase stator winding and converting alternating-current output from said polyphase stator winding into direct current,
    wherein said rotor comprises:
        a Lundell-type rotor core having a number of claw-shaped magnetic poles providing said north-seeking (N) and south-seeking (S) poles; and
        a cooling means for supplying cooling air inside said bracket by rotation of said rotor,
        whereby said coil end groups and said rectifier are cooled by passage of said cooling air inside said bracket.

14. The alternator according to claim 13 wherein said cooling means is a fan disposed on at least one axial end portion of said rotor core.

15. The alternator according to claim 14 wherein said fans are disposed on both axial end portions of said rotor core.

16. The alternator according to claim 13 wherein an axial length of said stator including said coil end groups is shorter than an axial length of said rotor core.

17. The alternator according to claim 13 wherein directions of inclination of said strands of wire constituting inner circumferential sides of said coil end groups are parallel at both axial ends of said stator.

18. The alternator according to claim 13 wherein:
    a number of slots housing said polyphase stator winding is two per pole per phase; and
    said polyphase stator winding comprises a first polyphase winding portion and a second polyphase winding portion each corresponding to one slot per pole per phase.

19. The alternator according to claim 18 wherein said first polyphase winding portion and said second polyphase winding portion are connected in series and winding ends thereof are connected to said rectifier.

20. The alternator according to claim 18 wherein said rectifier comprises:
    a first rectifier for converting alternating-current output from said first polyphase winding portion; and
    a second rectifier for converting alternating-current output from said second polyphase winding portion,
    output from said first polyphase winding portion and said second polyphase winding portion being combined after being converted separately by said first and second rectifiers.

21. The alternator according to claim 18 wherein each of said first and second polyphase winding portions is a three-phase connection, opening portions of slots constituting a slot group into which said first polyphase winding portion is inserted and opening portions of slots constituting a slot group into which said second polyphase winding portion is inserted being arranged at an even pitch corresponding to an electrical angle of 30°.

22. The alternator according to claim 18 wherein each of said first and second polyphase winding portions is a three-phase connection, opening portions of slots constituting a slot group into which said first polyphase winding portion is inserted and opening portions of slots constituting a slot group into which said second polyphase winding portion is inserted being arranged so as to alternate between an electrical angle of ($\alpha°$) and an electrical angle of ($60°-\alpha°$).

23. The alternator according to claim 18 wherein at least one of said first and second polyphase winding portions is a star-connection and a neutral point of said star connected polyphase winding portion is connected to said rectifier.

24. The alternator according to claim 13 wherein a field current flowing to a field coil for supplying a magnetic field to said claw-shaped magnetic poles is limited when rotational frequency of said alternator is greater than or equal to a predetermined value.

25. The alternator according to claim 13 wherein magnets are interposed between said claw-shaped magnetic poles.

26. An alternator comprising:

a rotor for forming north-seeking (N) and south-seeking (S) poles about a rotational circumference;

a stator comprising:
a stator core disposed facing said rotor; and
a polyphase stator winding installed in said stator core; and a bracket supporting said rotor and said stator, wherein said stator core comprises a laminated iron core formed with a number of slots extending axially at a predetermined pitch in a circumferential direction, said polyphase stator winding comprises a number of winding sub-portions in each which a long strand of wire is wound so as to alternately occupy an inner layer and an outer layer in a slot depth direction within said slots at intervals of a predetermined number of slots, said strand of wire folding back outside said slots at axial end surfaces of said stator core to form turn portions, and said turn portions align in a circumferential direction to constitute coil end groups at both axial end portions of said stator core, wherein 2n strands of said strands of wire are disposed in a row in said depth direction in each of said slots; and said turn portions of said strands of wire are arranged so as to align into n rows in a circumferential direction.

27. An alternator comprising:

a rotor for forming north-seeking (N) and south-seeking (S) poles about a rotational circumference;

a stator comprising:
a stator core disposed facing said rotor; and
a polyphase stator winding installed in said stator core; and a bracket supporting said rotor and said stator, wherein said stator core comprises a laminated iron core formed with a number of slots extending axially at a predetermined pitch in a circumferential direction, said polyphase stator winding comprises a number of winding sub-portions in each which a long strand of wire is wound so as to alternately occupy an inner layer and an outer layer in a slot depth direction within said slots at intervals of a predetermined number of slots, said strand of wire folding back outside said slots at axial end surfaces of said stator core to form turn portions, and said turn portions align in a circumferential direction to constitute coil end groups at both axial end portions of said stator core, wherein 2n strands of said strands of wire are disposed in a row in said depth direction in each of said slots; and said turn portions of said strands of wire are arranged so as to stack up into n layers, where n is an integer which is equal to or more than 2.

* * * * *